United States Patent
Takayanagi et al.

(10) Patent No.: US 10,967,613 B2
(45) Date of Patent: Apr. 6, 2021

(54) LAMINATE SHEET AND MANUFACTURING METHOD THEREFOR

(71) Applicant: SHINDO CO., LTD., Fukui (JP)

(72) Inventors: Kuniyoshi Takayanagi, Fukui (JP); Shinya Shirasaki, Fukui (JP); Arisa Nakano, Fukui (JP)

(73) Assignee: SHINDO CO., LTD., Fukui (JP)

( * ) Notice: Subject to any disclaimer, the term of this patent is extended or adjusted under 35 U.S.C. 154(b) by 577 days.

(21) Appl. No.: 15/325,809

(22) PCT Filed: Oct. 30, 2015

(86) PCT No.: PCT/JP2015/005467
§ 371 (c)(1),
(2) Date: Jan. 12, 2017

(87) PCT Pub. No.: WO2016/067627
PCT Pub. Date: May 6, 2016

(65) Prior Publication Data
US 2017/0225437 A1  Aug. 10, 2017

(30) Foreign Application Priority Data

Oct. 31, 2014 (JP) .............................. JP2014-222463
Aug. 5, 2015 (JP) .............................. JP2015-155495

(51) Int. Cl.
*B32B 25/20* (2006.01)
*B32B 25/08* (2006.01)
(Continued)

(52) U.S. Cl.
CPC .............. *B32B 25/20* (2013.01); *B32B 5/145* (2013.01); *B32B 7/10* (2013.01); *B32B 25/08* (2013.01);
(Continued)

(58) Field of Classification Search
CPC ... B32B 25/20; B32B 2038/0076; B32B 7/10; B32B 25/08; B32B 2309/02; B32B 37/06
(Continued)

(56) References Cited

U.S. PATENT DOCUMENTS 6,156,434 A * 12/2000 Hayashi ................. B32B 15/08
156/272.6
7,879,450 B2 * 2/2011 Matsuda ................ C08J 7/0427
428/447
(Continued)

FOREIGN PATENT DOCUMENTS

JP 10-321887 A 5/1997
JP 2001-079948 A 3/2001
(Continued)

OTHER PUBLICATIONS

ChemCall; http://www.chemicalland21.com/specialtychem/perchem/DICUMYL%20PEROXIDE.htm; Year retrieved from Wayback Machine (Year: 2006).*
(Continued)

*Primary Examiner* — Philip C Tucker
*Assistant Examiner* — Jimmy R Smith, Jr.
(74) *Attorney, Agent, or Firm* — Merchant & Gould, P.C.

(57) ABSTRACT

A method for manufacturing a laminate sheet including a fluororesin film and a silicone rubber sheet that are adhered to one another, where the fluororesin film has a reactive functional group as a result of a surface treatment, the side with the reactive functional group is overlapped with an organic peroxide-containing millable-type silicone rubber composition, where the silicone rubber composition is sheet-shaped and the organic peroxide has a one-minute half-life temperature in the range of 100–150° C., and the silicone rubber composition is cured by being heated under pressure at 90-135° C. The laminate sheet has a peel adhesion (Continued)

strength of 3N or more. The four corners of a 120 mm square test sample of the laminate sheet do not curve into one end of a semicircular arc shape or one end of a C shape, and the average warpage value of the four corners is 35 mm or less.

5 Claims, 1 Drawing Sheet

(51) Int. Cl.
| | |
|---|---|
| B32B 37/06 | (2006.01) |
| B32B 37/14 | (2006.01) |
| B32B 38/00 | (2006.01) |
| B32B 27/32 | (2006.01) |
| B32B 5/14 | (2006.01) |
| B32B 27/30 | (2006.01) |
| B32B 7/10 | (2006.01) |
| B32B 27/28 | (2006.01) |

(52) U.S. Cl.
CPC ............ *B32B 27/28* (2013.01); *B32B 27/285* (2013.01); *B32B 27/30* (2013.01); *B32B 27/322* (2013.01); *B32B 37/06* (2013.01); *B32B 37/14* (2013.01); *B32B 38/00* (2013.01); *B32B 38/004* (2013.01); *B32B 2038/0076* (2013.01); *B32B 2264/102* (2013.01); *B32B 2307/50* (2013.01); *B32B 2307/73* (2013.01); *B32B 2307/748* (2013.01); *B32B 2309/02* (2013.01); *B32B 2309/04* (2013.01); *B32B 2309/105* (2013.01); *B32B 2309/12* (2013.01); *B32B 2319/00* (2013.01); *B32B 2327/18* (2013.01); *B32B 2439/60* (2013.01); *B32B 2439/80* (2013.01)

(58) Field of Classification Search
USPC .......................................................... 156/60
See application file for complete search history.

(56) References Cited

U.S. PATENT DOCUMENTS

| | | | | |
|---|---|---|---|---|
| 2004/0097605 A1* | 5/2004 | Kurisu | ........................ | C08J 9/06 521/50.5 |
| 2005/0092429 A1 | 5/2005 | Jing et al. | | |
| 2005/0191454 A1 | 9/2005 | Kaneko et al. | | |
| 2008/0293127 A1* | 11/2008 | Chiang | ............... | B01L 3/50851 435/283.1 |
| 2010/0170632 A1* | 7/2010 | Gautriaud | ............... | B32B 27/16 156/244.17 |
| 2010/0310805 A1 | 12/2010 | Ou et al. | | |
| 2013/0040156 A1* | 2/2013 | Nakano | ................... | B32B 25/08 428/495 |
| 2014/0248496 A1* | 9/2014 | Kuwajima | .............. | B32B 25/08 428/422 |
| 2017/0121516 A1 | 5/2017 | Kawashima et al. | | |
| 2018/0030175 A1 | 2/2018 | Miura et al. | | |

FOREIGN PATENT DOCUMENTS

| | | |
|---|---|---|
| JP | 2005-022403 A | 1/2005 |
| JP | 2007-061605 A | 3/2007 |
| JP | 2007-527333 A | 9/2007 |
| JP | 2007-307771 A | 11/2007 |
| JP | 2009-186786 A | 8/2009 |
| JP | 2010-089479 A | 4/2010 |
| JP | 2010-253728 A | 11/2010 |
| JP | 2010-253729 A | 11/2010 |
| JP | 2012-126015 A | 12/2010 |
| JP | 2012-514547 A | 6/2012 |
| JP | 2012-529540 A | 11/2012 |
| JP | 2013-099935 A | 5/2013 |
| JP | 2015-178258 A | 10/2015 |
| WO | 2003/098088 A1 | 11/2003 |
| WO | 2004/018201 A | 3/2004 |
| WO | 2009/020181 A | 2/2009 |

OTHER PUBLICATIONS

International Search Report issued in corresponding application No. PCT/JP2015/005467, completed Jan. 14, 2016 and dated Jan. 26, 2016.
International Preliminary Report on Patentability issued in corresponding application No. PCT/JP2015/005467, completed Aug. 1, 2016 and dated Oct. 6, 2016.
Dicumyl Perioxide (Isopropyl Benzene Peroxide), downloaded from www.chemicaland21.com/specialtychem/perchem/DICUMYLPEROXIDE.htm on May 30, 2019.
Diakyl Peroxides, Luperox chemical information, retrieved electronically on Aug. 7, 2019.

* cited by examiner

LAMINATE SHEET AND MANUFACTURING METHOD THEREFOR

This is a National Phase application in the United States of International Patent Application No. PCT/JP2015/005467 filed Oct. 30, 2015, which claims priority on Japanese Patent Application No. 2014-222463 filed Oct. 31, 2014 and Japanese Patent Application No. 2015-155495 filed Aug. 5, 2015. The entire disclosures of the above patent applications are hereby incorporated by reference.

TECHNICAL FIELD

The present invention relates to a method for manufacturing a laminate sheet comprising a fluororesin film and a silicone rubber sheet, and relates to a laminate sheet comprising a fluororesin film and a silicone rubber sheet.

BACKGROUND ART

It is difficult to adhere a fluororesin to the other resins. Many methods for physically treating its surface and many methods for chemically treating its surface have been proposed.

Manufacturing a laminate wherein a fluororesin layer adheres to a rubber layer is not easy because it is difficult to adhere a fluororesin to a rubber.

As procedures enhancing adhesion between a fluororesin layer and a rubber layer, (1) a method for introducing a reactive functional group at molecular terminals and/or side chains of a fluororesin by a copolymerization, (2) a method for incorporating a adhesion promoter into a fluororesin, (3) a method for incorporating a adhesion promoter into a rubber, (4) a method for combining (1) and (2), (5) a method for combining (1) and (3), and (6) a method for combining (1), (2) and (3) have been proposed. Furthermore, a method for adhering a rubber to a fluororesin on which a primer has been applied has been proposed.

Patent document 1 (JP2005-022403A) and Patent document 2 (JP2009/020181A1) disclose (4), (5), and (6). Patent document 3 (JP2010-089479A) and Patent document 7 (JP2013-099935A) disclose (5). Patent document 4 (JP2010-253729A) disclose (1). Patent document 5 (JP2010-253729A) and Patent document 6 (JP2012-126015A) disclose almost (3). Patent document 8 (JP2004/018201A1) discloses (7).

Patent document 2 (JP2009/020181A1) discloses a laminate comprising a fluororesin layer (a) which is composed of a fluororesin having a carbonyl, olefine or amino group at molecular terminals and/or side chains of a polymer prepared by copolymerization, and an elastomer layer (b) which is composed of an elastomer composition; the aforementioned laminate wherein the fluororesin of the fluororesin layer (a) contains at least one multifunctional compound (c), and the afore-mentioned laminate wherein the elastomer composition of the elastomer layer (b) contains at least one of compounds selected from onium salt, amine compound, and epoxy resin, and cites various elastomer compositions exemplified by a silicone rubber.

Patent document 3 (JP2010-089479A) discloses a laminate comprising a rubber layer (A) which is formed from a vulcanizable rubber composition containing an unvulcanized rubber (a1) and an amine compound (a2) and a fluororesin layer (B) which is composed of a fluororesin (b) having a carbonyl, olefine(alkenyl) or amino group at molecular terminals and/or side chains of a polymer prepared by copolymerization, and discloses various kinds of unvulcanized rubbers as the unvulcanized rubbers exemplified by a silicone rubber.

Patent document 4 (JP2010-253728A) discloses a laminate comprising a fluororesin layer (a) which is composed of a fluororesin having at least one functional group selected from the group consisting of a hetero cyclic, sulphonyl, sulfo, mercapto, acyl, hydroxyl, alkenyl, azo, diazo, cyanate, disulphide, imino, isocyano, nitrile, nitro, nitroso, peroxy, epoxy, carbonyl, olefin(alkenyl) and amino group at molecular terminals and/or side chains of a polymer prepared by copolymerization, and an elastomer layer (b) which is formed from an elastomer composition, and exemplifies a silicone rubber composition as the elastomer composition.

PRIOR ART DOCUMENT

Patent Document

[Patent Document 1] JP2005-022403A
[Patent Document 2] JP2009/020181A1 (Japanese republication of WO2009/020181)
[Patent Document 3] JP2010-089479A
[Patent Document 4] JP2010-253728A
[Patent Document 5] JP2010-253729A
[Patent Document 6] JP2012-126015A
[Patent Document 7] JP2013-099935A
[Patent Document 8] JP2004/018201A1 (Japanese republication of WO2004/018201)

SUMMARY OF INVENTION

Objects to be Solved by the Invention

Modification of the fluororesin polymer by copolymerization disclosed in the above-mentioned patent documents may cause changes in basic physical properties, and a raise in cost.

The proposed adhesion promoters do not have definite compatibility to silicone rubbers. There is no Practical Examples of laminates wherein a fluororesin layer and a silicone rubber layer adhere together. Even if the fluororesin layer and the silicone rubber layer adhere, there are problems such that cutting or repeated bending of the laminate sheet may cause separation between the fluororesin layer and the silicone rubber layer.

A tetrafluoroethylene-perfluoro(alkyl vinyl ether) copolymer tube is adhered to a silicone rubber-coated roll by applying a primer to the silicone rubber-coated roll, overlaying the resulting silicone rubber-coated roll with a tetrafluoroethylene-perfluoro(alkyl vinyl ether) copolymer tube, and baking said tube in one of embodiments of Patent Document 8. This process is not suitable for manufacturing laminate sheets.

Even if the adhesion between the fluororesin layer and the silicone rubber layer is good, the laminate sheet warps or curls because the silicone rubber largely shrinks than the fluororesin. As a result, such laminate sheet has problems such as intractability and difficulty of processing which conforms to the intended use.

The present invention has been accomplished in consideration of the afore-mentioned problems.

It is an object of the present invention to provide a method for manufacturing a laminate sheet comprising a fluororesin film and a silicone rubber sheet wherein the fluororesin film and the silicone rubber sheet are firmly adhered to one another and having small warpage, and to provide a laminate sheet comprising a fluororesin film and a silicone rubber sheet wherein the fluororesin film and the silicone rubber sheet are firmly adhered to one another and having small warpage.

Such objects are solved by the following.

"[1] A method for manufacturing a laminate sheet wherein a fluororesin film with a thickness of from 10 to 1000 μm and a silicone rubber sheet with a thickness of from 0.5 to 5.0 mm are adhered to one another, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 35 mm or less, said method being characterized in that: the fluororesin film with a thickness of from 10 to 1000 μm which has a reactive functional group as a result of a surface treatment and a millable-type silicone rubber composition sheet with a thickness of from 0.5 to 5.0 mm, which contains an organic peroxide having a one-minute half-life temperature in the range of from 100 to 150° C., are overlapped, so as for the side having a reactive functional group as a result of a surface treatment to contact with the silicone rubber composition; and the silicone rubber composition is cured by being heated under pressure at from 90 to 135° C.

[2] The method for manufacturing the laminate sheet according to [1], wherein the fluororesin film is tetrafluoroethylene-hexafluoropropylene copolymer (FEP) film, tetrafluoroethylene-perfluoroalkyl vinyl ether copolymer (PFA), or polytetrafluoroethylene (PTFE) film.

[3] The method for manufacturing the laminate sheet according to [1] or [2], wherein the reactive functional group is a polar functional group consisting of carbon atom and oxygen atom, a polar functional group consisting of carbon atom and oxygen atom and hydrogen atom, or an unsaturated aliphatic hydrocarbon group.

[3-1] The method for manufacturing the laminate sheet according to [3], wherein the polar functional group consisting of carbon atom and oxygen atom is a carbonyl group, the polar functional group consisting of carbon atom and oxygen atom and hydrogen atom is an epoxy group, and the unsaturated aliphatic hydrocarbon group is a lower alkenyl group.

[4] The method for manufacturing the laminate sheet according to [1], [2], or [3], wherein the organic peroxide which has a one-minute half-life temperature in the range of from 100 to 150° C. is diacylperoxides or peroxyesters.

[5] A method for manufacturing a laminate sheet wherein a fluororesin film with a thickness of from 10 to 1000 μm which has a reactive functional group as a result of a surface treatment and a silicone rubber sheet with a thickness of from 0.2 to less than 0.5 mm are adhered to one another, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 35 mm or less, said method being characterized in that: the fluororesin film with a thickness of from 10 to 1000 μm, which has a reactive functional group as a result of a surface treatment, and a millable-type silicone rubber composition sheet with a thickness of from 0.2 to less than 0.5 mm, which contains an organic peroxide having a one-minute half-life temperature in the range of from 100 to 150° C., are overlapped, so as for the side having a reactive functional group as a result of a surface treatment to contact with the silicone rubber composition; and the silicone rubber composition is cured by being heated under pressure at from 90 to 135° C.

[6] A laminate sheet that comprises a fluororesin film which has a reactive functional group as a result of a surface treatment and a silicone rubber sheet characterized in that a fluororesin film with a thickness of from 10 to 1000 μm and a silicone rubber sheet with a thickness of from 0.5 to 5.0 mm are adhered to one another, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 35 mm or less.

[7] The laminate sheet according to [6], wherein the fluororesin film is tetrafluoroethylene-hexafluoropropylene copolymer (FEP) film, tetrafluoroethylene-perfluoroalkyl vinyl ether copolymer (PFA), or polytetrafluoroethylene (PTFE) film.

[8] The laminate sheet according to [6] or [7], wherein the reactive functional group is a polar functional group consisting of carbon atom and oxygen atom, a polar functional group consisting of carbon atom and oxygen atom and hydrogen atom, or an unsaturated aliphatic hydrocarbon group.

[8] The laminate sheet according to [8], wherein the polar functional group consisting of carbon atom and oxygen atom is a carbonyl group, the polar functional group consisting of carbon atom and oxygen atom and hydrogen atom is an epoxy group, and the unsaturated aliphatic hydrocarbon group is a lower alkenyl group.

[9] The laminate sheet that comprises a fluororesin film and a silicone rubber sheet characterized in that a fluororesin film with a thickness of from 10 to 1000 μm, which has a reactive functional group as a result of a surface treatment and a silicone rubber sheet with a thickness of from 0.2 to less than 0.5 mm are adhered to one another, the laminate sheet has a peel adhesion strength based on JIS K6854-2 (adhesives—method for testing peel adhesion strength—part 2: 180 degree peel) of 3N or more the four corners of a 120 mm square test sample of the laminate sheet do not curve into one end of a semicircular arc shape or one end of a C shape, and the average warpage value of the four corners is 35 mm or less.

[10] A method for manufacturing a laminate sheet wherein a fluororesin film with a thickness of from 10 to 1000 μm which has a reactive functional group as a result of a surface treatment adheres to both sides of a silicone rubber sheet with a thickness of from 0.5 to 5.0 mm, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 35 mm or less, said method being characterized in that: the fluororesin film with a thickness of from 10 to 1000 μm which has a reactive functional group as a result of a surface treatment, is overlapped on both sides of a millable-type silicone rubber composition sheet with a thickness of from 0.5 to 5.0 mm, which contains an organic peroxide having a one-minute half-life temperature in the range of from 100 to 150° C., so as for the side having a reactive functional group as a result of a surface treatment to contact with the silicone rubber composition; and the silicone rubber composition is cured by being heated under pressure at 90 to 160° C.

[11] The method for manufacturing the laminate sheet according to [10], wherein the fluororesin film is tetrafluoroethylene-hexafluoropropylene copolymer (FEP) film, tetrafluoroethylene-perfluoroalkyl vinyl ether copolymer (PFA), or polytetrafluoroethylene (PTFE) film.

[12] The method for manufacturing the laminate sheet according to [10] or [11], wherein the reactive functional group is a polar functional group consisting of carbon atom and oxygen atom, a polar functional group consisting of carbon atom and oxygen atom and hydrogen atom, or an unsaturated aliphatic hydrocarbon group.

[12-1] The method for manufacturing the laminate sheet according to [12], wherein the polar functional group consisting of carbon atom and oxygen atom is a carbonyl group, the polar functional group consisting of carbon atom and oxygen atom and hydrogen atom is an epoxy group, and the unsaturated aliphatic hydrocarbon group is a lower alkenyl group.

[13] The method for manufacturing the laminate sheet according to [10], [11], [12], or [12-1], wherein the organic peroxide which has a one-minute half-life temperature in the range of from 100 to 150° C. is diacylperoxides or peroxyesters.

[14] A method for manufacturing a laminate sheet comprising a fluororesin film and a silicone rubber sheet wherein a fluororesin film with a thickness of from 10 to 1000 μm which has a reactive functional group as a result of a surface treatment adheres to both sides of a silicone rubber sheet with a thickness of from 0.2 to less than 0.5 mm, the laminate sheet has a peel adhesion strength based on JIS K6854-2 (adhesives-method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 35 mm or less, said method being characterized in that: the fluororesin film with a thickness of from 10 to 1000 μm which has a reactive functional group as a result of a surface treatment is overlapped on both sides of a millable-type silicone rubber composition sheet with a thickness of from 0.2 to less than 0.5 mm, which contains an organic peroxide having a one-minute half-life temperature in the range of from 100 to 150° C., so as for the side having a reactive functional group as a result of a surface treatment to contact with the silicone rubber composition; and the silicone rubber composition is cured by being heated under pressure at from 90 to 160° C.

[15] A laminate sheet comprising a fluororesin film and a silicone rubber sheet wherein a fluororesin film with a thickness of 10 to 1000 μm which has a reactive functional group as a result of a surface treatment adheres to both sides of a silicone rubber sheet with a thickness of from 0.2 to less than 0.5 mm, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 5 mm or less.

[16] The method for manufacturing the laminate sheet according to [15], wherein the fluororesin film is tetrafluoroethylene-hexafluoropropylene copolymer (FEP) film, tetrafluoroethylene-perfluoroalkyl vinyl ether copolymer (PFA), or polytetrafluoroethylene (PTFE) film.

[17] The method for manufacturing the laminate sheet according to [15] or [16], wherein the reactive functional group is a polar functional group consisting of carbon atom and oxygen atom, a polar functional group consisting of carbon atom and oxygen atom and hydrogen atom, or an unsaturated aliphatic hydrocarbon group.

[17-1] The method for manufacturing the laminate sheet according to [17], wherein the polar functional group consisting of carbon atom and oxygen atom is a carbonyl group, the polar functional group consisting of carbon atom and oxygen atom and hydrogen atom is an epoxy group, and the unsaturated aliphatic hydrocarbon group is a lower alkenyl group.

[18] A laminate sheet comprising a fluororesin film and a silicone rubber sheet wherein a fluororesin film with a thickness of from 10 to 1000 μm, which has a reactive functional group as a result of a surface treatment adheres to both sides of a silicone rubber sheet with a thickness of from 0.2 to less than 0.5 mm, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 5 mm or less.

[19] A method for manufacturing a laminate sheet wherein a fluororesin film with a thickness of from 10 to 1000 μm and a silicone rubber sheet with a thickness of from 0.5 to 5.0 mm are adhered to one another, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 35 mm or less, said method being characterized in that: the fluororesin film with a thickness of from 10 to 1000 μm which has a reactive functional group as a result of a surface treatment, and a millable-type silicone rubber composition sheet with a thickness of from 0.5 to 5.0 mm, which contains an organic peroxide having a one-minute half-life temperature in the range of from 100 to 150° C., which has been manufactured by preparing a millable-type silicone rubber base by homogeneously blending (A) an alkeny-containing diorganopolysiloxane gum having at least two alkenyl groups per molecule and (B) a hydrophobized fumed silica, adding an organic peroxide having a one-minute half-life temperature in the range of from 100 to 150° C. to the millable-type silicone rubber composition, and homogeneously blending them, are overlapped, so as for the side having a reactive functional group as a result of a surface treatment to contact with the silicone rubber composition, and the silicone rubber composition is cured by being heated under pressure at from 90 to 135° C.

[20] The method for manufacturing the laminate sheet according to [19], wherein the fluororesin film is tetrafluoroethylene-hexafluoropropylene copolymer (FEP) film, tetrafluoroethylene-perfluoroalkyl vinyl ether copolymer (PFA), or polytetrafluoroethylene (PTFE) film.

[21] The method for manufacturing the laminate sheet according to [19] or [20], wherein the reactive functional group is a polar functional group consisting of carbon atom and oxygen atom, a polar functional group consisting of carbon atom and oxygen atom and hydrogen atom, or an unsaturated aliphatic hydrocarbon group.

[21-1] The method for manufacturing the laminate sheet according to [21], wherein the polar functional group consisting of carbon atom and oxygen atom is a carbonyl group, the polar functional group consisting of carbon atom and oxygen atom and hydrogen atom is an epoxy group, and the unsaturated aliphatic hydrocarbon group is a lower alkenyl group.

[22] The method for manufacturing the laminate sheet according to [19], [20], [22], or [20-1], wherein the organic peroxide which has a one-minute half-life temperature in the range of from 100 to 150° C. is diacylperoxides or peroxyesters.

[23] A method for manufacturing a laminate sheet wherein a fluororesin film with a thickness of from 10 to 1000 μm and a silicone rubber sheet with a thickness of from 0.5 to 5.0 mm are adhered to one another, the laminate sheet has a peel adhesion strength based on JIS K6854-2 (adhesives—method for testing peel adhesion strength—part 2: 180 degree peel) of 3N or more, the four corners of a 120 mm square test sample of the laminate sheet do not curve into one end of a semicircular arc shape or one end of a C shape, and the average warpage value of the four corners is 35 mm or less, said method being characterized in that: the fluororesin film with a thickness of from 10 to 1000 μm which has a reactive functional group as a result of a surface treatment, and a millable-type silicone rubber composition sheet with a thickness of from 0.2 to less than 0.5 mm, which contains an organic peroxide having a one-minute half-life temperature in the range of from 100 to 150° C., which has been manufactured by preparing a millable-type silicone rubber base by homogeneously blending (A) an alkenyl-containing diorganopolysiloxane gum and (B) a hydrophobized fumed silica, adding an organic peroxide having a one-minute half-life temperature in the range of from 100 to 150° C. to the millable-type silicone rubber composition, and homogeneously blending them, are overlapped, so as for the side having a reactive functional group as a result of a surface treatment to contact with the silicone rubber composition; and the silicone rubber composition is cured by being heated under pressure at from 90 to 135° C.

Effect of the Invention

According to the method for manufacturing a laminate sheet comprising a fluororesin film and a silicone rubber sheet of the present invention, it is possible easily and surely to manufacture a laminate sheet comprising a fluororesin film and a silicone rubber sheet wherein the fluororesin film and the silicone rubber sheet, i.e., silicone rubber layer, are firmly adhered to one another and having small warpage degree. The laminate sheet comprising a fluororesin film and a silicone rubber sheet of the present invention is easy to handle, and processing which conforms to the intended use is easy since the fluororesin film and the silicone rubber sheet, i.e., silicone rubber layer, are firmly adhered to one another and the laminate sheet has small warpage degree.

Even if it is subjected to secondary vulcanization in a high temperature air, the adhesion between the fluororesin film and the silicone rubber sheet is maintained. Cyclic organosiloxane oligomers can be removed easily.

According to the method for manufacturing a laminate sheet of the present invention wherein fluororesin films are layered on both sides of a silicone rubber sheet, it is possible easily and surely to manufacture a laminate sheet wherein the fluororesin films and the silicone rubber sheet, that is, silicone rubber layer, are firmly adhered to one another and having very small warpage degree or no warpage.

The laminate sheet of the present invention wherein fluororesin films are layered on both sides of a silicone rubber sheet is easy to handle, and processing which conforms to the intended use is easy because the fluororesin films and the silicone rubber sheet, i.e., silicone rubber layer, are firmly adhered to one another and the laminate sheet has very small warpage degree or no warpage.

MODE FOR CARRYING OUT THE INVENTION

Figure 1:
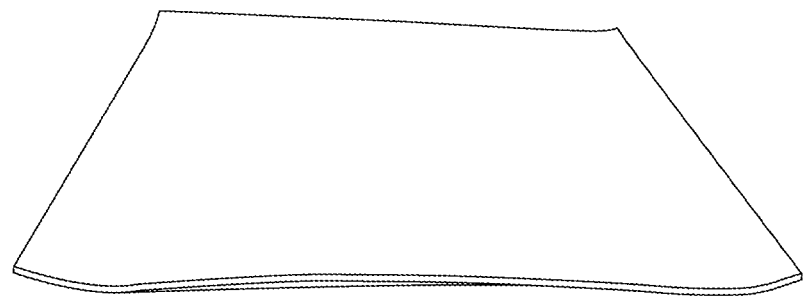
FIG. 1 is a photograph of the laminate sheet in Practical Example 9 of the present invention.
Figure 2:
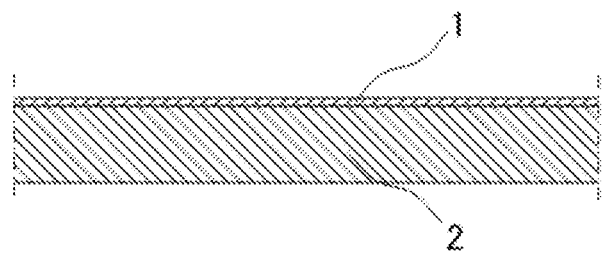
FIG. 2 is a local sectional view of the laminate sheet in Practical Example 9 of the present invention.
Figure 3:
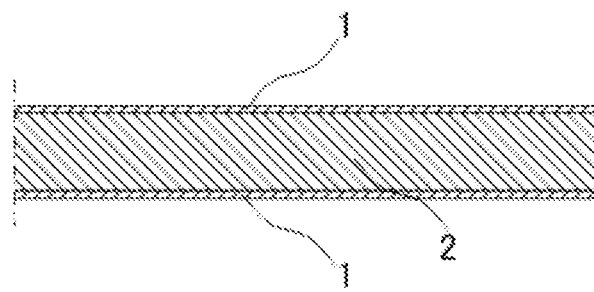
FIG. 3 is a local sectional view of the laminate sheet in Practical Example 13 of the present invention.

The fluororesin film having a reactive functional group as a result of a surface treatment which is used for manufacturing a laminate sheet comprising a fluororesin film and a silicone rubber layer of the present invention can be manufactured by subjecting the surface of a untreated fluororesin film to electric discharge treatment in an inert gas atmosphere containing a reactive functional organic compound Fluororesins therefor are not specifically restricted, provided that they can become filmy. Examples are polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-ethylene copolymer (ETFE), tetrafluoroethylene-vinylidene fluoride copolymer (TFE/VdF), tetrafluoroethylene-hexafluoropropylene-perfluoroalkyl vinyl ether copolymer (EPA), polychlorotrifluoroethylene (PCTFE), chlorotrifluoroethylene-ethylene copolymer (ECTFE), chlorotrifluoroethylene-vinylidene fluoride copolymer (CTFE/VdF), poly((vinylidene fluoride)(PVdF), poly(vinyl fluoride) (PVF), and the like.

Films made of such fluororesin with various thickness are sold by DAIKIN INDUSTRIES, LTD., ASAHI GLASS CO., LTD. and et al.

DAIKIN INDUSTRIES, LTD. sells NEOFLON PFA film comprising nine grades with a thickness in the range of from 12.5 to 2400 μm and NEOFLON FEP film comprising nine grades with a thickness in the range of from 12.5 μm to 2400 μm, and surface-modified grades. NEOFLON is a registered trademark owned by DAIKIN INDUSTRIES, LTD.

ASAHI GLASS CO., LTD. sells AFLEX/F-CLEAN as fluorocarbon films which have been fabricated from Fluon ETFE and comprises nine grades with a thickness in the range of from 12 μm to 200 μm, and sells a grade wherein one side of the film is corona-treated. Fluon, AFLEX, and F-CLEAN are registered trademarks of ASAHI GLASS CO., LTD.

Discharge treatments are exemplified by conventional corona discharge treatment, glow discharge treatment, plasma discharge treatment and sputtering treatment (JPS37 (1962)-17485B, JPS49(1974)-12900B, U.S. Pat. No. 3,296, 011A).

For example, in the corona discharge treatment, the surface treatment is carried out by exposing an untreated surface of a fluororesin film to an atmosphere of an inert gas (for example, nitrogen gas, helium gas, argon gas, or the like) containing an organic compound having a reactive functional group, applying a high frequency voltage between electrodes to generate corona discharge, thereby producing active species on the surface of the fluororesin film, subsequently boding or reacting the functional group of the organic compound to the active species.

Conditions in the corona discharge may be properly selected according to a dielectric constant of a fluororesin film and intended amount of the reactive functional group. Conditions in glow discharge treatment, plasma discharge treatment and sputtering treatment are the same except for methods inducing the discharge.

Surface modification treatments for introducing a reactive functional group are exemplified by ultraviolet ray irradiation treatment, laser treatment, flame treatment, high frequency wave treatment, ozone oxidation treatment, and so on.

Surface modification treatments are exemplified by surface etching treatment, for example, sodium-liquid ammonia solution method wherein the surface of a fluororesin film (for example, polytetrafluoroethylene) is contacted with a solution prepared by dissolving sodium metal into liquid ammonia solution (for example, a solution containing from 0.3 to 20.0 grams sodium per 1 liter liquid ammonia), and tetra-etch method wherein the surface of a fluororesin film is contacted with a solution of electron-donating type complex of an alkaline metal, for example, naphthalene dispersion prepared by dispersing sodium into naphthalene having a comparatively high boiling point.

Time-of-flight secondary ion mass spectrometry is well known as a technique for analyzing the very thin film having a thickness of a few nanometers which has been formed in this way.

Representative examples of the reactive functional group in an organic compound having a reactive functional group are a polar functional group consisting of carbon atom and oxygen atom exemplified by a carbonyl group, an unsaturated aliphatic hydrocarbon group exemplified by alkenyl group such as vinyl group, allyl group, and so on, a polar functional group consisting of carbon atom, oxygen atom, and hydrogen atom exemplified by epoxy group, acryloxy group, and methacryloxy group, and a polar functional group consisting of carbon atom, oxygen atom, nitrogen atom, and hydrogen atom exemplified by amide group.

Epoxy group and carbonyl group are preferable, and a combination of epoxy group and carbonyl group are more preferable.

The organic compound having a reactive functional group must exist in a gaseous state, i.e., vapor state in an inert gas atmosphere.

Its concentration is ordinarily in the range of from 0.1 to 10.0% by mole, and preferably in the range of from 0.5 to 7.0% by mole, though it differs depending on kind of the organic compound.

The organic compound needs to have a vapor pressure of 1 mm Hg or more at discharge treatment temperatures which are ordinarily from 20 to 100° C.

Examples of the organic compound having such reactive functional group include glycidyl methacrylate, glycidyl acrylate, aceton, methylethylketon, glycidyl allylate, propylene, butadiene, vinylmethylether, vinylethylether, methylglycidylether, buthylglycidylether, and 2-ethylhexylglycidylether.

The fluororesin film ordinarily has a thickness of from 10 to 1000 μm, preferably a thickness of from 20 to 510 μm, and more preferably a thickness of from 40 to 260 μm. The thickness is not limited to these ranges, because preferable thickness vary depending on intended use of the laminate sheet.

The fluororesin film has shapes exemplified by sheet-like, tape-like, and strip-shaped.

The fluororesin film of which at least one side have been modified by an organic compound having a reactive functional group, that is, the fluororesin film having a reactive functional group on its surface can be manufactured by subjecting at least one side of a fluororesin film exemplified by polytetrafluoroethylene (PTFE) film, tetrafluoroethylene-perfluoroalkyl vinyl ether copolymer (PFA) film, or tetrafluoroethylene-hexafluoropropylene copolymer (FEP) film to a surface treatment such as electric discharge treatment under a charge density of 3 Wsec/cm$^2$ in an inert gas atmosphere which contains an organic compound having a reactive functional group ordinarily in the range of from 0.1 to 10.0% by mole, and preferably in the range of from 0.5 to 7.0% by mole in a gaseous state.

DAIKIN INDUSTRIES, LTD. sells NEOFLON PFA film with a thickness of 50 μm of which one side is treated and NEOFLON FEP film with a thickness 100 μm of which both sides are treated, and NEOFLON FEP film with a thickness of 50 μm or 100 μm of which both sides are treated.

ASAHI GLASS CO., LTD. sells AFLEX/F-CLEAN as fluororesin film with a thickness of 12 μm which has been fabricated from Fluon and of which one side is corona-treated.

A millable-type silicone rubber composition containing an organic peroxide which is used in the method of the laminate sheet of the present invention representatively comprises (A) an alkenyl-containing diorganopolysiloxane gum having at least two alkenyl groups per molecule, (B1) a hydrophobized reinforcing silica, and (D) an organic peroxide having a one-minute half-life temperature in the range of from 100 to 150° C., or comprises (A) an alkenyl-containing diorganopolysiloxane gum having at least two alkenyl groups per molecule, (B2) a reinforcing silica, (C) hydrophobizing agent, and (D) an organic peroxide having a one-minute half-life temperature in the range of from 100 to 150° C.

In the best mode of the present invention, preferably, silicon atom-bonded organic group is methyl group and the alkenyl group is vinyl group in component (A), and the reinforcing silica is dry-process silica or wet-process silica.

In terms of molding workability, Williams plasticity defined in JIS K6249 at 25° C. is preferably from 100 to 400, more preferably from 120 to 300, and further preferably from 140 to 280.

The alkenyl-containing diorganopolysiloxane gum (A) is a main component, and has at least two alkenyl groups on average per molecule.

Alkenyl groups are exemplified by vinyl, allyl, or propenyl groups, among which vinyl group is preferable.

Organic groups other than alkenyl groups may be exemplified by methyl, ethyl, propyl, butyl, pentyl, hexyl, octyl, decyl, dodecyl, or similar alkyl groups; phenyl, tolyl, or similar aryl groups; benzyl, [beta]-phenylethyl, or similar aralkyl groups; 3,3,3-trifluoropropyl, 3-chloromethyl, or similar halogenated alkyl groups wherein alkyl groups and halogenated alkyl groups have preferably from 2 to 12 carbon atoms, aryl groups have preferably from 2 to 6 carbon atoms, and aralkyl groups have preferably from 7 to 12 carbon atoms It is preferable that all organic groups other than alkenyl groups bonded to silicon atoms are methyl groups.

50% by mole or more of organic groups may be methyl groups, and other organic groups may be alkyl groups having from 2 to 12 carbon atoms, phenyl groups, or alkyl groups having from 2 to 12 carbon atoms and phenyl groups.

It is preferable that the alkenyl-containing diorganopolysiloxane gum (A) has ordinarily from 2 to 50 alkenyl groups bonded to silicon atoms on average per molecule, and has especially from 2 to 20 alkenyl groups bonded to silicon atoms, especially vinyl groups bonded to silicon atoms.

It is preferable that from 0.02 to 4.0%, especially from 0.01 to 0.6% by mole of all organic groups are alkeyl groups, especially vinyl groups.

The alkenyl-containing diorganopolysiloxane gum (A) are blocked at both molecular terminals with triorganosiloxy groups such as dimethylvinyl siloxy group, methylphenylvinyl siloxy group, trimethylsiloxy group, etc. It can be blocked with silanol groups.

The molecular structure of component (A) is preferably a straight-chain, but may be a straight-chain having some branches. Component (A) is gum-like at normal temperature. It is possible to measure Williams plasticity defined in JIS K6249 of component (A) at 25° C.

Component (A) has preferably a polystyrene-referenced number-average molecular weight measured by gel permeation in the range of from 200,000 to 700,000.

Component (A) ordinarily has a degree of polymerization in the range of from 2,000 to 50,000, and preferably in the range of from 3,000 to 20,000.

Representative examples of component (A) include a dimethylpolysiloxane blocked at both molecular terminals with dimethylvinylsiloxy groups; a copolymer of dimethylsiloxane and methylvinylsiloxane blocked at both molecular terminals with dimethylvinylsiloxy groups; a copolymer of dimethylsiloxane and methylvinylsiloxane blocked at both molecular terminals with hydroxydimethylsiloxy groups; a copolymer of dimethylsiloxane, methylvinylsiloxane, and methylphenylsiloxane blocked at both molecular terminals with dimethylvinylsiloxy groups; a dimethylpolysiloxane blocked at both molecular terminals with methylphenylvinylsiloxy groups; a copolymer of dimethylsiloxane and methylvinylsiloxane blocked at both molecular terminals with methylphenylvinylsiloxy groups.

Among these, dimethylpolysiloxane blocked at both molecular terminals with dimethylvinylsiloxy groups; a copolymer of dimethylsiloxane and methylvinylsiloxane blocked at both molecular terminals with dimethylvinylsiloxy groups; a copolymer of dimethylsiloxane and methylvinylsiloxane blocked at both molecular terminals with hydroxydimethylvinylsiloxy groups; a copolymer of dimethylsiloxane and methylphenylsiloxane blocked at both molecular terminals with dimethylvinylsiloxy groups are provided for practical use to the highest degree.

Two or more alkenyl-containing diorganopolysiloxanes can be used together.

(B1) Hydrophobized reinforcing silica and (B2) reinforcing silica impart roll-workability and calendar-workability to millable-type silicone rubber compositions, thereby make them easy to become sheet-like.

They impart excellent mechanical strength and hardness to the silicone rubber obtained by heat-curing millable-type silicone rubber compositions.

The reinforcing silica fillers are exemplified by fumed silica which is a typical example of dry-process silica, precipitated silica which is a typical example of wet-process silica, and aerogel.

Fumed silica is ultra microparticulate amorphous silica which is produced by vaporizing silicon tetrachloride and oxidizing the vaporized silicon tetrachloride in hydrogen-oxygen flames at high-temperatures. It is a typical example of dry-process silica. It ordinarily has BET-specific surface area in the range of from 100 to 400 $m^2/g$. Commercial products are exemplified by AEROSIL 200 having a BET specific surface area of 200 $m^2/g$, AEROSIL 255 having a BET specific surface area of 255 $m^2/g$, AEROSIL 300 having a BET specific surface area of 300 $m^2/g$, AEROSIL 380 having a BET specific surface area of 380 $m^2/g$ which are products of NIPPON AEROSIL CO., LTD., and REOLOSIL which is a product of Tokuyama Corporation. AEROSIL is a registered trade mark owned by Evonik Degussa Gmbh, and REOLOSIL is a registered trade mark owned by Tokuyama Corporation Precipitated silica is a typical example of wet process silica.

Precipitated silica is microparticulate amorphous silica which is prepared by adding a mineral acid such as hydrochloric acid, sulfuric acid, etc. to liquid glass, that is, sodium silicate, and removing water and salts after neutralization reaction. Precipitated silica is hydrophilic because it has many silanol groups and much adsorbed water.

BET specific surface area of precipitated silica is 30 $m^2/g$ or more, and ordinarily from 20 $m^2/g$ to 400 $m^2/g$. Average secondary particle diameter of precipitated silica is ordinarily from 0.1 μm to 100 μm, and preferably about from 0.2 μm to 50 μm. Hydrophobized precipitated silica is also sold.

Examples of commercial products include Nipsil made by Tosoh Silica Corporation, Carplex made by DSL. Japan Co., Ltd., and Tokusil made by Tokuyama Corporation. Nipsil is registered trademark of Tosoh Silica Corporation, Carplex is registered trademark of DSL. Japan Co., Ltd., and Tokusil is registered trademark of Tokuyama Corporation.

Component (B1) is exemplified by reinforcing silica (B2) which has been hydrophobized by a hydrophobizing agent (C), wherein reinforcing silica (B2) is exemplified by dry process silica such as fumed silica and wet process silica such as precipitated silica, and hydrophobizing agent (C) is exemplified by organochlorosilane such as trimethylchlorosilane and dimethyldicholorosilane, organoalkoxysilane such as trimethylmethoxysilane, hexaorganodisilazane such as hexamethyldisilazane, silanol-endblocked dimethylsiloxane oligomer, and cyclic dimethylsiloxane oligomer. Hydrophobized reinforcing silica among which dry-process silica treated by cyclic dimethylsiloxane oligomer, for example, cyclic dimethylsiloxane tetramer is the most preferable.

Examples of commercial products of hydrophobized reinforcing silica include AEROSIL R972 having a BET specific surface area of 110 $m^2/g$, AEROSIL RX200 having a BET specific surface area of 140 $m^2/g$, AEROSIL R812 having a BET specific surface area of 260 $m^2/g$ which are sold by NIPPON AEROSIL CO., LTD.

Hydrophobized fumed silica as component (B1) and fumed silica as component (B2) have a BET specific surface area of 50 $m^2/g$ or more, preferably 100 $m^2/g$ or more. They ordinarily have a BET specific surface area of 400 $m^2/g$ or less.

Hydrophobized fumed silica and fumed silica having a BET specific surface area of from 110 to 300 $m^2/g$ are provided for practical use.

If BET specific surface area is less than 50 $m^2/g$, a silicone rubber obtained by curing the millable silicone rubber composition will not have sufficient physical strength.

Compounding amount of component (B1) and component (B2) is preferably from 10 to 70 parts by mass, more preferably from 20 to 55 parts by mass per 100 parts by mass of component (A).

Compounding amount of hydrophobizing agent (C) is enough mass to hydrophobize component (B2).

The millable-type silicone rubber composition containing an organic peroxide which is used in the method of manufacturing the laminate sheet of the present invention is manufactured by producing a millable-type silicone rubber base by blending the afore-mentioned component (A) and component (B1) or component (A), component (B2), and component (C) in a prescribed amount in a kneader mixer, continuous mixing device and so on at room temperature or at elevated temperature, and subsequently by adding component (D) to the millable-type silicone rubber base at room temperature and homogeneously mixing them on a two-roll mill.

Such millable-type silicone rubber bases are sold by Dow Corning Toray Co., Ltd., Shin-Etsu Chemical Co., Ltd., et al.

Such millable-type silicone rubber bases can be cured also through a hydrosilylation reaction.

(D) An organic peroxide having a one-minute half-life temperature in the range of from 100 to 150° C. is employed as a curing agent for the millable-type silicone rubber composition in the method for manufacturing the laminate sheet of the present invention.

As specific examples of such organic peroxide, the following can be adduced: diacylperoxides such as dioctanoylperoxide, di(3,5,5-trimethyhexanoyl)peroxide, dibenzoyl peroxide, di(4-methyl)benzoyl peroxide, di(3-methyl) benzoyl peroxide, di(2-methyl)benzoyl peroxide, and disuccinic acid peroxide; peroxyesters such as t-hexyl peroxyneodecanoate, t-butyl peroxyneodecanoate, t-hexyl peroxypivalate, t-butyl peroxypivalate, 1,1,3,3-tetra-methyl butyl peroxy-2-ethylhexanoate, 2,5-dimethyl-2,5-bis-2-ethyl hexanoyl peroxyhexane, tert-butylperoxy-2-ethylhexanoate, tert-butylperoxy-iso-butylate.

Usage of an organic peroxide having a one-minute half-life temperature in the range of from 95 to 150° C. as a curing agent has the advantage of lowering the curing temperature of a millable-type silicone rubber composition and decreasing the warpage of a manufactured laminate sheet.

Considering safety during handling, usage of an organic peroxide having a one-minute half-life temperature in the range of from 100 to 150° C. is preferable.

From the viewpoint of safety during handling and laminate sheet's warpage, having a one-minute half-life temperature in the range of from 110 to 140° C. is preferable, and having a one-minute half-life temperature in the range of from 110 to 135° C. is more preferable.

Typical examples are dibenzoyl peroxide (one-minute half-life temperature: 131° C.), bis(4-methyl)benzoyl peroxide(one-minute half-life temperature: 128.2° C.), bis(3-methyl)benzoyl peroxide (one-minute half-life temperature: 131.3° C.), t-butyl peroxypivalate (one-minute half-life temperature: 110.3° C.), tert-butylperoxy-2-ethylhexanoate (one-minute half-life temperature: 134° C.), t-butyl peroxyisobutylate (one-minute half-life temperature: 136.1° C.), 1,1,3,3-tetramethyl butyl peroxy-2-ethylhexanoate (one-minute half-life temperature: 124.3° C.), dilauroyl peroxide (one-minute half-life temperature: 116.4° C.), di(3,5,5-trimethylhexanoyl)peroxideperoxide (one-minute half-life temperature: 112.6° C.), t-hexyl peroxypivalate (one-minute half-life temperature: 109.1° C.), tert-butylperoxy-2-ethylheptanoate (one-minute half-life temperature: 104.6° C.), tert-butylperoxyneodecanoate (one-minute half-life temperature: 103.5° C.), tert-hexylperoxyneodecanoate (one-minute half-life temperature: 100.9° C.), di-n-octanoylperoxide (one-minute half-life temperature: 117.4° C.).

These organic peroxides can be used individually or in combination of two or more. These organic peroxides are usually diluted with a hydrophobic liquid diluent or inactive inorganic powder in order to enhance safety and to lengthen retention period.

(D) organic peroxide having a one-minute half-life temperature in the range of from 95 to 150° C. is compounded in an enough amount to cure a silicone rubber base comprising component (A) and component (B1) or a silicone rubber base comprising component (A), component (B2) and component (C). In particular, component (D) is compounded in an amount of from 0,1 to 5 parts by mass, preferably from 0.2 to 2 parts by mass per 100 parts by mass of the silicone rubber base.

The millable-type silicone rubber composition used in the method for manufacturing a laminate sheet of the present invention comprises the afore-mentioned silicone rubber base comprising component (A) and component (B1) or silicone rubber base comprising component (A), component (B2) and component (C), and a predetermined amount of component (D).

Within the limits which do not contradict to the objects of the invention, the millable-type silicone rubber composition may be combined with various agents which are well known and conventionally added to normal silicone rubber compositions in addition to them.

Examples of such agents include diatomaceous earth powder, quartz powder, carbon black, or similar extending fillers; titanium oxide, carbon black, red oxide, organic pigments, or similar pigments; rare-earth oxide powder, cerium silanolate, cerium fatty-acid salts, or similar heat-resistant agents; benzotriazole, fumed titanium dioxide, manganese carbonate, zinc carbonate, platinum compound, or similar flame retardants; calcium stearate, or similar mold-release agents.

The laminate sheet of the present invention comprising a fluororesin film and a silicone rubber sheet, i.e., silicone rubber layer can be manufactured by the process that a fluororesin film with a thickness of from 10 to 1000 μm which has a reactive functional group as a result of a surface treatment, and a millable-type silicone rubber composition sheet which contains an organic peroxide having a one-minute half-life temperature in the range of 100 to 150° C. are overlapped, so as for the side having a reactive functional group as a result of a surface treatment to contact with the silicone rubber composition sheet; and the silicone rubber composition is cured by being heated under pressure at from 90 to 135° C.

It is necessary to cure under pressure because a side contacting with air of the millable-type silicone rubber composition sheet suffer from very poor curing if the millable-type silicone rubber composition is cured under no pressure.

Compression molding and press molding are suitable. Hot-air curing is not suitable since curing is carried out under no pressure.

Curing temperature under pressure is in the range of from 90° C. to 135° C., but the range of from 98° C. to 132° C. is preferable since curing temperature being a little more than 90° C. requires long curing time, and curing temperature being more than 130° C. has a tendency to cause large warpage value of a laminate sheet.

Curing time may be enough time to cure the millable-type silicone rubber composition containing the organic peroxide. The higher curing temperature, the shorter curing time. Curing time is usually from 120 to 5 minutes, preferably from 70 to 5 minutes, and more preferably from 35 to 5 minutes.

Silicone rubber cured only under pressure may have a smell of degradation products of an organic peroxide. It is preferable to remove degradation products of the organic peroxide by placing the laminate sheet in a warm wind or a hot wind being higher than the normal temperature. Gas therefor is preferably heated air, and may be heated gas such as heated nitrogen gas, etc.

In case that a silicone rubber sheet, i.e., silicone rubber layer constituting the laminate sheet contains dry-process silica such as fumed silica and the like, the gas temperature is preferably 250° C. or less, and more preferably 230° C. or less for preventing warpage increase of the laminate sheet.

It is preferable to place the laminate sheet in a warm wind or a hot wind until a smell of degradation products of an organic peroxide disappears. Four hours are possible, but 90 minutes or less is preferable since too long hours are a waste of time In case that a silicone rubber sheet, i.e., silicone rubber layer constituting the laminate sheet contains wet-process silica such as precipitated silica and the like, the gas temperature is preferably 120° C. or less for preventing warpage increase of the laminate sheet and decrease of peel adhesion strength.

It is preferable to keep the laminate sheet in a warm wind or a hot wind until a smell of degradation products of an organic peroxide disappears. Forty minutes or less are preferable.

A silicone rubber sheet, i.e., silicone rubber layer constituting the laminate sheet has a thickness of from 0.2 to 5.0 mm, preferably from 0.5 to 5.0 mm.

In case that the silicone rubber sheet, i.e., silicone rubber layer has too thin thickness, it is difficult to manufacture a laminate sheet having uniform thickness, and too large thickness of the silicone rubber sheet, i.e., silicone rubber layer is meaningless. Hardness of the silicone rubber sheet, i.e., silicone rubber layer which is a cured product of the millable-type silicone rubber composition containing an organic peroxide is usually from 5 to 85, and preferably from 10 to 75 as a hardness defined in JIS K6249 which is measured with type A durometer.

In thus manufactured laminate sheet wherein a fluororesin film having a reactive functional group as a result of a surface treatment and a silicone rubber sheet are layered, the fluororesin film and the silicone rubber sheet, i.e., the silicone rubber layer are adhered to one another, the laminate sheet has a peel adhesion strength based on JIS K6854-2 (adhesives—method for testing peel adhesion strength—part 2: 180 degree peel) of 3N or more, preferably 5N or more. It is most preferably impossible to peel the silicone rubber sheet, i.e., the silicone rubber layer on the fluororesin film even if a kerf is formed between the fluororesin film and the silicone rubber sheet, i.e., the silicone rubber layer by means of a blade. that is, it is impossible to peel the silicone rubber sheet, i.e., the silicone rubber layer from the fluororesin film.

Thus manufactured laminate sheet wherein a fluororesin film having a reactive functional group as a result of a surface treatment and a silicone rubber sheet are layered has such flatness that the average warpage value of the four corners of a 120 mm square test sample of the laminate sheet is 35 mm or less, preferably 28 mm or less.

In the later described [Test for the average warpage of laminate sheet], the laminate sheet of 120 mm square has such flatness that the average warpage value of the four corners is 35 mm or less, preferably 28 mm or less per the length of one side of the laminate sheet of 120 mm square in a plain view. The laminate sheet of 120 mm square has such flatness that the average warpage value of the four corners is 35 mm or less, preferably 28 mm or less.

Even one corner of the four corners do not curve into one end of a semicircular arc shape or one end of a C shape.

Punching operation to small shapes is easy in laminate sheets having such average warpage value, and small punched laminate sheets have a flatness. Punching shapes are exemplified by circular, square, prolong rectangle, polygon, circular having a diameter of from 5 to 120 mm, and square of which one side is from 5 to 120 mm.

With respect to the laminate sheet comprising a fluororesin film and a silicone rubber sheet characterized by that a fluororesin film with a thickness of from 10 to 1000 μm and a silicone rubber sheet with a thickness of from 0.5 to 5.0 mm are adhered to one another, and the average warpage value of the four corners of a 120 mm square test sample of the laminate sheet is 35 mm or less, a side of the silicone rubber sheet which does not contact with the fluororesin film is preferably covered in an adhesion state by a rigid thermoplastic film.

The laminate sheet wherein a side of the silicone rubber sheet which does not contact with the fluororesin film is covered in an adhesion state by a rigid thermoplastic film has no warpage and becomes quite flat.

The quite flat laminate sheet is convenient for storage, transport, and punching operation.

Sticking of foreign materials to a side of the silicone rubber sheet which does not contact with the fluororesin film can be prevented by covering said side with a releasable rigid thermoplastic film in a state of sticking.

The rigid thermoplastic film is exemplified by polyethylene-terephthalate film and rigid polyvinyl chloride resin film.

The laminate sheet comprising a fluororesin film and a silicone rubber sheet defined in claim 6 and claim 9 of the present application has small average warpage. Therefore, it is possible to stack plural laminate sheets mutually so as for a side of the silicone rubber sheet to contact with non-surface treated side of the fluororesin film. Mutually stacked plural laminate sheets are convenient for storage, transport and usage.

A laminate sheet comprising a fluororesin film and a silicone rubber sheet characterized in that a fluororesin film with a thickness of from 10 to 1000 μm which has a reactive functional group as a result of a surface treatment on one side adheres to both sides of a silicone rubber sheet with a thickness of from 0.2 to less than 0.5 mm, and the average warpage value of the four corners of a 120 mm square test sample of the laminate sheet is 5 mm or less can be manufactured by overlapping a fluororesin film with a thickness of from 10 to 1000 μm which has a reactive functional group as a result of a surface treatment on one side on both sides of a millable-type silicone rubber composition sheet with a thickness of from 0.2 to less than 0.5 mm, which contains an organic peroxide having a one-minute half-life temperature in the range of 100 to 150° C., so as for the side having a reactive functional group as a result of a surface treatment to contact with the silicone rubber composition; and heating the silicone rubber composition under pressure at from 90 to 160° C. to cure the silicone rubber composition.

In thus manufactured laminate sheet comprising a fluororesin film and a silicone rubber sheet wherein a fluororesin film with a thickness of from 10 to 1000 μm which has a reactive functional group as a result of a surface treatment adheres to both sides of a silicone rubber sheet with a thickness of from 0.2 to less than 0.5 mm, said fluororesin films firmly adhere to said silicone rubber sheet, i.e., silicone rubber layer. The laminate sheet has a peel adhesion strength based on JIS K6854-2 (adhesives-method for testing peel adhesion strength—part 2: 180 degree peel) of 3N or more, preferably 5N or more, most preferably 18N or more. It is most preferably impossible to peel the silicone rubber sheet, i.e., the silicone rubber layer on the fluororesin film even if a kerf is formed between the fluororesin film and the silicone rubber sheet, i.e., the silicone rubber layer by means of a blade. It is impossible to peel the silicone rubber sheet, i.e., the silicone rubber layer from the fluororesin film.

Thus manufactured laminate sheet comprising a fluororesin film and a silicone rubber sheet wherein a fluororesin film with a thickness of from 10 to 1000 μm which has a reactive functional group as a result of a surface treatment adheres to both sides of a silicone rubber sheet with a thickness of from 0.2 to less than 0.5 mm has such flatness that the average warpage value of the four corners of a 120 mm square test sample of the laminate sheet is usually 5 mm or less, preferably quite flatness in the later described [Test for the average warpage of laminate sheet].

Even one corner of the four corners do not curve into one end of a semicircular arc shape or one end of a C shape.

The average warpage value of the four corners of a 120 mm square test sample of the laminate sheet is usually 5 mm or less, preferably quite flat. Even one corner of the four corners do not curve into one end of a semicircular arc shape or one end of a C shape.

The laminate sheet comprising the fluororesin film and the silicone rubber sheet defined in claim 6, claim 9, and claim 18 of the present application is useful as a sealing material for a cap for sealing an opening of a bottomed cylindrical vial containing medicines or various test reagents. The sealing material is internally fitted into a plastic cap or a metal cap in order to seal an opening part on the top side of a vial. The laminate sheet is useful as a packing, water shielding sheet, and gas shielding sheet.

EXAMPLES

The invention will be explained in detail by way of practical examples and comparative examples. The laminate sheet has been manufactured in accordance with the following procedures. Properties of the laminate sheet was measured in accordance with the following methods at room temperature. Parts in examples mean mass parts.

[Method for Manufacturing a Laminate Sheet Wherein a Silicone Rubber Sheet was adhesively layered on the surface of the one side of the fluororesin film which had a Reactive Functional Group as a Result of a Surface Treatment on One Side]

1) A millable-type silicone rubber base was loaded into a two roll mill and was kneaded. A predetermined amount of predefined organic peroxide was loaded into the two roll mill to blend to homogeneity. An organic peroxide-containing millable-type silicone rubber composition sheet with a thickness of 1.5 mm was taken out from a gap between the two rolls.

2) A metal frame (volume: 13.0 cc) with an inner size of 120 mm, an inner size of 120 mm, and a depth of 0.9 mm was set on a flat stainless steel plate having no distortion. The organic peroxide-containing millable-type silicone rubber composition sheet with a thickness of 1.5 mm was loaded into the metal frame, a clean rigid polyethylene-terephtalate film was overlaid on the organic peroxide-containing millable-type silicone rubber composition sheet in the metal frame, and a flat stainless steel plate having no distortion was placed on said film, thereby an assembly A was manufactured.

3) This assembly A was placed on a lower plate of press vulcanization equipment, the lower plate was elevated to an upper plate to lightly press the assembly A between both plates, thereby adjusted the thickness of the organic peroxide-containing millable-type silicone rubber composition sheet to become uniform.

4) This lightly pressed assembly A was taken out from the press vulcanization equipment, the stainless steel plate and the rigid polyethylene-terephtalate film were removed, and a trace amount of the organic peroxide-containing millable-type silicone rubber composition which overflowed toward outside of the metal frame was removed with a spatula, etc.

5) subsequently a fluororesin film which had a reactive functional group as a result of a surface treatment on one side was overlaid on the organic peroxide-containing millable-type silicone rubber composition sheet in the metal frame, so as for the one side having a reactive functional group as a result of a surface treatment to contact with the organic peroxide-containing millable-type silicone rubber composition, a rigid polyethylene-terephtalate film was overlaid on said fluororesin film, a flat stainless steel plate having no distortion was placed on said polyethylene-terephtalate film, thereby an assembly B was manufactured.

7) This assembly B was placed on a lower plate of press vulcanization equipment which was heated to a predetermined curing temperature, the lower plate was hydraulically upheaved to an upper plate to press the assembly B between both plates under 200 kgf/cm$^2$ and to heat the assembly B at a predetermined temperature.

8) The lower plate was lowered after lapsing of a predetermined time, and the pressed assembly B was taken out.

9) The stainless steel plate and the rigid polyethylene-terephtalate film on the assembly B were removed, and a laminate sheet wherein a silicone rubber sheet is adhesively laminated on the surface of the one side of the fluororesin film which had a reactive functional group as a result of a surface treatment on one side was taken out from the metal frame.

[Method for Manufacturing a Laminate Sheet Wherein a Fluororesin Film which has a Reactive Functional Group as a Result of a Surface Treatment on One Side is Adhesively Layered on Both Sides of a Silicone Rubber Sheet]

1) A millable-type silicone rubber base was loaded into a two roll mill and was kneaded. A predetermined amount of predefined organic peroxide was loaded into the two roll mill to blend to homogeneity. An organic peroxide-containing millable-type silicone rubber composition sheet with a thickness of 1.5 mm was taken out from a gap between the two rolls.

2) A fluororesin film which had a reactive functional group as a result of a surface treatment on one side was overlaid on a flat stainless steel plate having no distortion, so as for the one side having a reactive functional group as a result of a surface treatment to face up.

A metal frame (volume: 13.0 cc) with an inner size of 120 mm, an inner size of 120 mm, and a depth of 0.9 mm was set on this fluororesin film, an organic peroxide-containing millable-type silicone rubber composition sheet (volume: 13.5 cc) was loaded into the aforementioned metal frame, a clean rigid polyethylene-terephtalate film was overlaid on the organic peroxide-containing millable-type silicone rubber composition sheet in the metal frame, and a flat stainless steel plate having no distortion was placed on said film, thereby an assembly A was manufactured.

3) This assembly A was placed on a lower plate of press vulcanization equipment, the lower plate was elevated to a upper plate to lightly press the assembly A between both plates, thereby adjust the thickness of the organic peroxide-containing millable-type silicone rubber composition sheet to become uniform.

4) This lightly pressed assembly A was taken out from the press vulcanization equipment, the stainless steel plate and the rigid polyethylene-terephtalate film were removed, and a trace amount of the organic peroxide-containing millable-type silicone rubber composition which overflowed toward outside of the metal frame was removed with a spatula, etc.

5) Subsequently a fluororesin film which had a reactive functional group as a result of a surface treatment on one side was overlaid on the organic peroxide-containing millable-type silicone rubber composition sheet in the metal frame so as for the one side having a reactive functional group as a result of a surface treatment to with the organic peroxide-containing millable-type silicone rubber composition, a rigid polyethylene-terephtalate film was overlaid on said fluororesin film, a flat stainless steel plate having no distortion was placed on said polyethylene-terephtalate film, thereby an assembly B was manufactured.

7) This assembly B was placed on a lower plate of press vulcanization equipment which was heated to a predetermined curing temperature, the lower plate was hydraulically upheaved to an upper plate to press the assembly B between both plates under 200 kgf/cm$^2$ and to heat the assembly at a predetermined temperature.

8) The lower plate was lowered after elapsing of a predetermined time, and the pressed assembly B was taken out.

9) The stainless steel plate and the rigid polyethylene-terephtalate film on the assembly B were removed, and a laminate sheet where in the fluororesin film which had a reactive functional group as a result of a surface treatment on one side was adhesively laminated on both sides of a silicone rubber sheet so as for one side having said reactive functional group to contact with both sides of the silicone rubber sheet was taken out from the metal frame.

[Test for Peel Adhesion Strength of Laminate Sheets]

The manufactured laminate sheet being 120 mm long and 120 mm wide were cut into 115 mm-long and 20 mm-wide strips.

With respect to the end of this strip, a kerf was formed between the fluororesin film and the silicone rubber sheet by using a blade, 3-cm-long silicone rubber sheet on the fluororesin film was peeled to the length direction, the head of the fluororesin film and the head of the silicone rubber sheet were clutched with chucks of a tensile tester and were stretched in 180 degree opposite direction for carrying out a peel adhesion strength test based on JIS K6854-2 "Adhesive agent-Peel adhesion strength test method-Part 2: 180 degree peeling". Tension rate was 80 mm/min. Acceptability criterion was 3N/25 mm.

In case the silicone rubber sheet on the fluororesin film could not be peeled to the length direction even if a kerf was formed between the fluororesin film and the silicone rubber sheet by using a blade because of large adhesion strength between the fluororesin film and the silicone rubber sheet, "Peeling was impossible" was described. Measurements were carried out at 25° C.

[Observation of Warpage Degree of Laminate Sheets]

Figure 4:
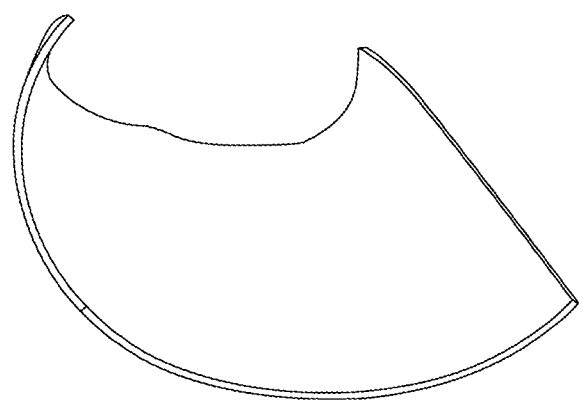
FIG. 4 is a photograph of the laminate sheet in Comparative Example 1 of the present invention.

Aforementioned laminate sheets taken out from the metal frame of an inner size of 120 mm, an inner size of 120 mm, and a depth of 0.9 mm had at least one slightly curled side or corner in many cases (see FIG. 1, FIG. 4). Said laminate sheet was placed so as to become concave on a flat surface, and warpages of four sides and four corners and warpage degrees were observed from the side with naked eyes.

[Test for Average Warpage Value of the Laminate Sheet]

Aforementioned laminate sheets taken out from the metal frame of an inner size of 120 mm, an inner size of 120 mm, and a depth of 0.9 mm was placed so as to become concave on a flat surface, distances (h1, h2, h3, and h4: unit is mm) from said flat surface at four corners were measured. Average of said distances shall be an average warpage value. The average warpage value was calculated by the following formula. average warpage value (mm)=(h1+h2+h3+h4)/4

In case at least one of the four corners of a 120 mm square test sample of the laminate sheet curved into one end of a semicircular arc shape or one end of a C shape, the laminate sheet was treated as a comparative example, an average warpage value was not calculated. "Warped to more than a semicircular arc shape" was described. Distances (h1, h2, h3, and h4: unit is mm) from said flat surface at four sides in place of four corners could be measured. Average of said distances should be an average warpage value. In case at least one of the four corners of a 120 mm square test sample of the laminate sheet curved into one end of a semicircular arc shape or one end of a C shape, the laminate sheet could be treated as a comparative example, an average warpage value could not be calculated. "Warped to more than a semicircular arc shape" could be described.

[Smell of Laminate Sheets]

Three persons in charge of experiments contacted their noses tightly with a silicone rubber side of each laminate sheet, and sniffed smells. "No smell" was described in case all persons judged that there was no smell.

[Materials Used in Practical Examples and Comparative Examples]

As a fluororesin film which has a reactive functional group as a result of a surface treatment on one side, a commercially available tetrafluoroethylene-hexafluoropropylene copolymer (FEP) film with a thickness of 50 μm which had carbonyl group and glycidyl group being reactive functional groups as a result of a surface treatment on one side or a tetrafluoroethylene-hexafluoropropylene copolymer (FEP) film with a thickness of 100 μm which had carbonyl group and glycidyl group being reactive functional groups as a result of a surface treatment on one side.

As millable-type silicone rubber bases, general purpose millable-type silicone rubber base XIAMETER RBB-6650-50BASE for metal mold-molding, general purpose millable-type silicone rubber base XIAMETER RBB-6650-30BASE for metal mold-molding, and general purpose millable-type silicone rubber base XIAMETER RBB-6650-70BASE for metal mold-molding were used. These silicone rubber bases are products of Dow Corning Corporation.

It is presumed that these silicone rubber bases contain diorganopolysiloxanes having silicon atom-bonded alkenyl groups such as vinyl groups since these silicone rubber bases could be cured under a hydrosilylation reaction as shown in Comparative Example 4.

XIAMETER Brand High Consistency Rubber (HCR) Bases Japan Selection Guide describes XIAMETER RBB- 6650-50Base and XIAMETER RBB-6650-30Base in General Purpose—PPT Silica, and XIAMETER RBB-2070-50 Base and XIAMETER RBB-2070-70 Base in General Purpose—Fumed Silica.

PPT Silica is another name of precipitation silica which is one of wet-process silicas. They contain from 20 to 30% by weight of silica according to Product Safety Data Sheets of Dow Corning Corporation. XIAMETER is a registered trademark of Dow Corning Corporation.

According to XIAMETER Brand High Consistency Rubber (HCR)Bases Japan Selection Guide, XIAMETER RBB-6650-50 Base has the following properties.

TABLE 1

| Items | Test method (unit) | Value |
|---|---|---|
| Properties before curing | | |
| Appearance | CTM 0176 | Milky white, Semi-transparent |
| Plasticity | JIS K 6249 (mm/100) | 230 |
| Properties after curing | | |
| Specific gravity | JIS K 6249 (g/cm$^3$) | 1.15 |
| Hardness (JIS type A) | JIS K 6249 | 51 |
| Tensile strength (No. 3 dumbbell) | JIS K 6249 (MPa) | 8.9 |
| Elongation (No. 3 dumbbell) | JIS K 6249 (%) | 350 |
| Tear strength (angle type) | JIS K 6249 (N/mm) | 21 |
| Linear shrinkage ratio (disk method) | JIS K 6249 (%) | 2.8 |

Notes:
Properties after curing were measured for specimens with a thickness of 2 mm.

The specimens were prepared by adding 0.6 part of RC-4(50P)(2,5-bis(t-butylperoxy)-2,5-dimethylhexane 50% paste) to 100 parts of XIAMETER RBB-6650-50 BASE, blending RC-4 and XIAMETER RBB-6650-50 BASE to homogeneity, subjecting the mixture to press vulcanization for 10 minutes at 170° C., and subjecting the vulcanizate to oven vulcanization (curing) for 4 hours at 200° C.

According to XIAMETER Brand High Consistency Rubber (HCR) Bases Japan Selection Guide, XIAMETER RBB-6650-30 Base has the following properties.

TABLE 2

| Items | Test method (unit) | Value |
|---|---|---|
| Properties before curing | | |
| Appearance | CTM 0176 | Milky white, Semi-transparent |
| Plasticity | JIS K 6249(mm/100) | 230 |
| Properties after curing | | |
| Specific gravity | JIS K 6249 (g/cm$^3$) | 1.11 |
| Hardness (JIS type A) | JIS K 6249 | 32 |
| Tensile strength (No. 3 dumbbell) | JIS K 6249 (MPa) | 7.4 |
| Elongation (No. 3 dumbbell) | JIS K 6249 (%) | 690 |
| Tear strength (angle type) | JIS K 6249 (N/mm) | 18 |
| Linear shrinkage ratio (disk method) | JIS K 6249 (%) | 3.5 |

Note:
Conditions for determining properties after curing are the same as them in Table 1.

According to XIAMETER Brand High Consistency Rubber (HCR) Bases Japan Selection Guide, XIAMETER RBB-2070-50 Base has the following properties.

TABLE 3

| Items | Test method (unit) | Value |
|---|---|---|
| Properties before curing | | |
| Appearance | CTM 0176 | Milky white, Semi-transparent |
| Plasticity | JIS K 6249(mm/100) | 218 |
| Properties after curing | | |
| Specific gravity | JIS K 6249 (g/cm$^3$) | 1.15 |
| Hardness (JIS type A) | JIS K 6249 | 51 |
| Tensile strength (No. 3 dumbbell) | JIS K 6249 (MPa) | 8.5 |
| Elongation (No. 3 dumbbell) | JIS K 6249 (%) | 607 |
| Tear strength (angle type) | JIS K 6249 (N/mm) | 18 |
| Linear shrinkage ratio (disk method) | JIS K 6249 (%) | 2.8 |

Note:
Conditions for determining properties after curing are the same as them in Table 1.

According to XIAMETER Brand High Consistency Rubber (HCR) Bases Japan Selection Guide, XIAMETER RBB-2070-70 Base has the following properties.

TABLE 4

| Items | Test method (unit) | Value |
|---|---|---|
| Properties before curing | | |
| Appearance | CTM 0176 | Milky white, Semi-transparent |
| Plasticity | JIS K 6249(mm/100) | 297 |
| Properties after curing | | |
| Specific gravity | JIS K 6249 (g/cm$^3$) | 1.21 |
| Hardness (JIS type A) | JIS K 6249 | 70 |
| Tensile strength (No. 3 dumbbell) | JIS K 6249 (MPa) | 8.0 |
| Elongation (No. 3 dumbbell) | JIS K 6249 (%) | 470 |
| Tear strength (angle type) | JIS K 6249 (N/mm) | 21 |
| Linear shrinkage ratio (disk method) | JIS K 6249 (%) | 2.9 |

Note:
Conditions for determining properties after curing are the same as them in Table 1.

AEROSIL RX200 (fumed silica hydrophobized by hexamethyldisilazane, BET specific surface area of 140 m$^2$/g) sold by NIPPON AEROSIL CO., LTD. as hydrophobized fumed silica for manufacturing millable-type silicone rubber bases in Practical Example 16 and Practical Example 17.

Bis(4-methyl)benzoyl peroxide (Product of Dow Corning Toray Co., Ltd., Product name: RC14A, Paste, Content: 50% by mass, one-minute half-life temperature: 128.2° C.), tert-butylperoxy-2-ethylhexanoate (Product of NOF CORPORATION, Product name: PERCURE™ O, Content: 50% by mass, one-minute half-life temperature: 134.0° C.), dibenzoyl peroxide (Product of Kayaku Akzo Corporation, Product name: Percadox CH-50L, Powder, Content: 50% by mass, one-minute half-life temperature: 131° C.) were used as organic peroxides.

Bis(1-phenyl-1-methylethyl)peroxide (another name: dicumylperoxide, Product of Dow Corning Toray Co., Ltd., Product name: RC-3(50P), Paste, Content: 50% by mass, one-minute half-life temperature: 175.2° C.) and 2,5-bis(t-butylperoxy)-2,5-dimethylhexane (Product of Dow Corning Toray Co., Ltd., Product name: RC-4(50P), Paste, Content: 50% by mass, one-minute half-life temperature: 177° C.) were used as organic peroxides in Comparative Examples except for Comparative Example 5.

A paste containing 75% by mass of a methylhydrogenpolysiloxane endblocked with trimethylsilyl groups with a viscosity of 50 mPa·s and a Sill content of 0.9% by mass and a platinum complex catalyst containing 150 ppm by mass of platinum were used as a curing agent under a hydrosilylation reaction, and a paste containing 1-ethynil-1-cyclohexanol was used as a curing retarder (Product of Dow Corning Toray Co., Ltd., RD9) in Comparative Example 4.

Practical Example 1

General purpose millable-type silicone rubber base XIAMETER RBB-6650-50 BASE for metal mold-molding was used as an organic peroxide-containing millable-type silicone rubber base.

Bis(4-methyl)benzoyl peroxide (Product of Dow Corning Toray Co., Ltd., Product name: RC14A, Content: 50% by mass, one-minute half-life temperature: 128.2° C.) was used as an organic peroxide having one-minute half-life temperature in the range of from 100 to 150° C.

The commercially available tetrafluoroethylene-hexafluoropropylene copolymer (FEP) film with a thickness of 100 μm which had carbonyl group and glycidyl group being reactive functional groups as a result of a surface treatment on one side as a fluororesin film which had a reactive functional groups as a result of a surface treatment on one side.

1.0 mass part of RC-14A was blended to 100 mass parts of XIAMETER RBB-6650-50 BASE by means of a two-roll mill, thereby an organic peroxide-containing millable-type silicone rubber composition sheet was prepared.

This organic peroxide-containing millable-type silicone rubber composition sheet was loaded into a metal frame with an inner size of 120 mm, an inner size of 120 mm, and a depth of 0.9 mm, and was flattened.

The fluororesin film which had a reactive functional group as a result of a surface treatment on one side was overlaid on the flattened organic peroxide-containing millable-type silicone rubber composition sheet, so as for one side having a reactive functional group as a result of a surface treatment to contact with said organic peroxide-containing millable-type silicone rubber composition, and the overlaid composite was heated under pressure for 10 minutes at 120° C., thereby a laminate sheet wherein the silicone rubber sheet, i.e., the silicone rubber layer was adhesively laminated on the surface of the one side of the fluororesin film which had a reactive functional group as a result of a surface treatment on one side was manufactured.

Details of manufacturing procedures are as described in the previous section [Method for manufacturing a laminate sheet wherein a silicone rubber sheet was adhesively layered on the surface of the one side of the fluororesin film which had a reactive functional group as a result of a surface treatment on one side], and are the same also in the following Practical Examples 1 to 12, 16, and 17, and Comparative Examples.

Curing conditions, thickness of silicone rubber layer, thickness of laminate sheet, peel adhesive strength, average warpage value, and so on were shown in Table 5. In the laminate sheet, the fluororesin film and the silicone rubber sheet, i.e., the silicone rubber layer were firmly adhered to one another, the laminate sheet had small warpage degree, and the fluororesin film had no crease.

Practical Example 2

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that the commercially available tetrafluoroethylene-hexafluoropropylene copolymer (FEP) film with a thickness of 50 μm which had carbonyl group and glycidyl group being reactive functional groups as a result of a surface treatment on one side in place of the commercially available tetrafluoroethylene-hexafluoropropylene copolymer (FEP) film with a thickness of 100 μm which had carbonyl group and glycidyl group being reactive functional groups as a result of a surface treatment on one side in Practical Example 1.

Curing conditions, thickness of silicone rubber layer, thickness of laminate sheet, peel adhesive strength, average warpage value and so on were shown in Table 5. In the laminate sheet, the fluororesin film and the silicone rubber sheet, i.e., the silicone rubber layer were firmly adhered to one another, the laminate sheet had small warpage degree, and the fluororesin film had no crease.

Practical Example 3

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that placing in a circulating hot air oven for 30 minutes at 120° C. was added after heating under pressure for 10 minutes at 120° C.

Curing conditions, thickness of silicone rubber layer, thickness of laminate sheet, peel adhesive strength, average warpage value, and so on were shown in Table 5. In the laminate sheet, the fluororesin film and the silicone rubber sheet, i.e., the silicone rubber layer were firmly adhered to one another, the laminate sheet had small warpage degree, and the fluororesin film had no crease.

Practical Example 4

General purpose millable-type silicone rubber base XIAMETER RBB-2070-50 BASE for metal mold-molding was used as an organic peroxide-containing millable-type silicone rubber base.

Bis(4-methyl)benzoyl peroxide (Product of Dow Corning Toray Co., Ltd., Product name: RC14A, Content: 50% by mass, one-minute half-life temperature: 128.2° C.) was used as an organic peroxide having one-minute half-life temperature in the range of from 100 to 150° C.

The commercially available tetrafluoroethylene-hexafluoropropylene copolymer (FEP) film with a thickness of 100 μm which had carbonyl group and glycidyl group being reactive functional groups as a result of a surface treatment on one side was used as a fluororesin film which had a reactive functional group as a result of a surface treatment on one side.

A laminate sheet wherein the silicone rubber sheet, i.e., the silicone rubber layer was adhesively laminated on the surface of the one side of the fluororesin film which had a reactive functional group as a result of a surface treatment on one side was manufactured by blending 1.0 mass part of RC-14A to 100 mass parts of XIAMETER RBB-2070-50 BASE, and heating under pressure for 120 minutes at 90° C.

Curing conditions, thickness of silicone rubber layer, thickness of laminate sheet, peel adhesive strength, average warpage value, and so on were shown in Table 6. In the laminate sheet, the fluororesin film and the silicone rubber sheet, i.e., the silicone rubber layer were firmly adhered to one another, the laminate sheet had small warpage degree, and the fluororesin film had no crease.

Practical Example 5

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 4 except that heating for 120 minutes at 90° C. was replaced by heating for 30 minutes at 100° C.

Curing conditions, thickness of silicone rubber layer, thickness of laminate sheet, peel adhesive strength, average warpage value, and so on were shown in Table 6. In the laminate sheet, the fluororesin film and the silicone rubber sheet, i.e., the silicone rubber layer were firmly adhered to one another, the laminate sheet had small warpage degree, and the fluororesin film had no crease.

Practical Example 6

A laminate sheet wherein the silicone rubber sheet, i.e., the silicone rubber layer was adhesively on the surface of the one side of the fluororesin film which had a reactive functional group as a result of a surface treatment on one side was manufactured in the same condition as in Practical Example 4 except that heating for 120 minutes at 90° C. was replaced by heating for 10 minutes at 120° C.

Curing conditions, thickness of silicone rubber layer, thickness of laminate sheet, peel adhesive strength, average warpage value, and so on were shown in Table 6. In the laminate sheet, the fluororesin film and the silicone rubber sheet, i.e., the silicone rubber layer were firmly adhered to one another, the laminate sheet had small warpage degree, and the fluororesin film had no crease.

Practical Example 7

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 4 except that heating for 120 minutes at 90° C. was replaced by heating for 10 minutes at 130° C.

Curing conditions, thickness of silicone rubber layer, thickness of laminate sheet, peel adhesive strength, average warpage value, and so on were shown in Table 6. In the laminate sheet, the fluororesin film and the silicone rubber sheet, i.e., the silicone rubber layer were firmly adhered to one another, the laminate sheet had small warpage degree, and the fluororesin film had no crease.

Practical Example 8

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that heating for 10 minutes at 120° C. was replaced by heating for 60 minutes at 100° C.

Curing conditions, thickness of silicone rubber layer, thickness of laminate sheet, peel adhesive strength, average warpage value, and so on were shown in Table 6. In the laminate sheet, the fluororesin film and the silicone rubber sheet, i.e., the silicone rubber layer were firmly adhered to one another, the laminate sheet had small warpage degree, and the fluororesin film had no crease.

Practical Example 9

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that XIAMETER RBB-6630-30 BASE was used in place of General purpose millable-type silicone rubber base XIAMETER RBB-6650-50 BASE for metal mold-molding.

Curing conditions, thickness of silicone rubber layer, thickness of laminate sheet, peel adhesive strength, average warpage value, and so on were shown in Table 7. In the laminate sheet, the fluororesin film and the silicone rubber sheet, i.e., the silicone rubber layer were firmly adhered to one another, the laminate sheet had small warpage degree, and the fluororesin film had no crease.

Practical Example 10

A laminate sheet wherein the silicone rubber sheet, i.e., the silicone rubber layer was adhesively laminated on one side, which had a reactive functional group as a result of a surface treatment, of the fluororesin film was manufactured in the same condition as in Practical Example 6 except that XIAMETER RBB-2070-70 BASE was used in place of General purpose millable-type silicone rubber base XIAMETER RBB-2070-50 BASE for metal mold-molding.

Curing conditions, thickness of silicone rubber layer, thickness of laminate sheet, peel adhesive strength, average warpage value, and so on were shown in Table 7. In the laminate sheet, the fluororesin film and the silicone rubber sheet, i.e., the silicone rubber layer were firmly adhered to one another, the laminate sheet had small warpage degree, and the fluororesin film had no crease.

Practical Example 11

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that PERCURE™ O (tert-butylperoxy-2-ethylhexanoate, Content: 50% by mass, one-minute half-life temperature: 134.0° C.) was used in place of RC-14A.

Curing conditions, thickness of silicone rubber layer, thickness of laminate sheet, peel adhesive strength, average warpage value, and so on were shown in Table 7. In the laminate sheet, the fluororesin film and the silicone rubber sheet, i.e., the silicone rubber layer were firmly adhered to one another, the laminate sheet had small warpage degree, and the fluororesin film had no crease.

Practical Example 12

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that Percadox CH-50L (Dibenzoylperoxide, Content: 50% by mass, one-minute half-life temperature: 131° C.) was used in place of RC-14A.

Curing conditions, thickness of silicone rubber layer, thickness of laminate sheet, peel adhesive strength, average warpage value, and so on were shown in Table 7. In the laminate sheet, the fluororesin film and the silicone rubber sheet had no crease Practical Example 13

General purpose millable-type silicone rubber base XIAMETER RBB-2070-50 BASE for metal mold-molding was used as an organic peroxide-containing millable-type silicone rubber base.

Bis(4-methyl)benzoyl peroxide (Product of Dow Corning Toray Co., Ltd., Product name: RC14A, Content: 50% by mass, one-minute half-life temperature: 128.2° C.) was used as an organic peroxide having one-minute half-life temperature in the range of from 100 to 150° C.

The commercially available tetrafluoroethylene-hexafluoropropylene copolymer (FEP) film with a thickness of 100 µm which had carbonyl group and glycidyl group being reactive functional groups as a result of a surface treatment on one side as a fluororesin film which had a reactive functional group as a result of a surface treatment on one side.

1.0 mass part of RC-14A per 100 mass parts of XIAMETER RBB-2070-50 BASE was blended with XIAMETER RBB-2070-50 BASE by means of a two-roll mill, thereby an organic peroxide-containing millable-type silicone rubber composition sheet was prepared.

The organic peroxide-containing millable-type silicone rubber composition sheet was overlaid on one side, which had a reactive functional group as a result of a surface treatment, of the fluororesin film so as for one side having a reactive functional group as a result of a surface treatment to face down, the overlaid composite was heated under pressure 30 minutes at 100° C., thereby a laminate sheet wherein the fluororesin film which had a reactive functional group as a result of a surface treatment on one side was adhesively laminated on both sides of the silicone rubber sheet, i.e., the silicone rubber layer was manufactured.

Details of manufacturing procedures are as described in the previous section [Method for manufacturing a laminate sheet wherein a fluororesin film which has a reactive functional group as a result of a surface treatment on one side is adhesively layered on both sides of a silicone rubber sheet], and are the same also in the following Practical Examples 14 and 15.

Curing conditions, thickness of silicone rubber layer, thickness of laminate sheet, peel adhesive strength, average warpage value, and so on were shown in Table 8. In the laminate sheet, the fluororesin film and the silicone rubber sheet, i.e., the silicone rubber layer were firmly adhered to one another, the laminate sheet had small warpage degree, and the fluororesin film had no crease.

Practical Example 14

A laminate sheet wherein the fluororesin film which had a reactive functional group as a result of a surface treatment on one side was adhesively laminated on both sides of the silicone rubber sheet, i.e., the silicone rubber layer was manufactured in the same condition as in Practical Example 13 except that heating for 30 minutes at 100° C. was replaced by heating for 10 minutes at 120° C.

Curing conditions, thickness of silicone rubber layer, thickness of laminate sheet, peel adhesive strength, average warpage value, and so on were shown in Table 8. In the laminate sheet, the fluororesin film and the silicone rubber sheet, i.e., the silicone rubber layer were firmly adhered to one another, the laminate sheet had small warpage degree, and the fluororesin film had no crease.

Practical Example 15

A laminate sheet wherein the fluororesin film which had a reactive functional group as a result of a surface treatment on one side was adhesively laminated on both sides of the silicone rubber sheet, i.e., the silicone rubber layer was manufactured in the same condition as in Practical Example 13 except that heating for 30 minutes at 100° C. was replaced by heating for 10 minutes at 150° C.

Curing conditions, thickness of silicone rubber layer, thickness of laminate sheet, peel adhesive strength, average warpage value, and so on were shown in Table 8. In the laminate sheet, the fluororesin film and the silicone rubber sheet, i.e., the silicone rubber layer were firmly adhered to one another, the laminate sheet had very small warpage degree, and the fluororesin film had no crease.

Comparative Example 1

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that RC-4(50P)(a paste containing 50% by mass of 2,5-bis(t-butylperoxy)-2,5-dimethylhexane, one-minute half-life temperature: 177° C.) was used in place of RC-14A, 0.6 part by mass of RC-4(50P) was compounded per 100 parts by mass of XIAMETER RBB-6650-50 BASE, and heating for 10 minutes at 120° C. was replaced by heating for 10 minutes at 170° C.

Curing conditions, thickness of silicone rubber layer, thickness of laminate sheet, peel adhesive strength, average warpage value, and so on were shown in Table 9. The laminate sheet had fairy small peel adhesive strength and had very large warpage degree.

Comparative Example 2

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that RC-3(50P)(a paste containing 50% by mass of bis(1-phenyl-1-methylethyl)peroxide, one-minute half-life temperature: 175.2° C.) was used in place of RC-14A, 4.5 part by mass of RC-3(50P) per 100 parts by mass of XIAMETER RBB-6650-50 BASE was blended with XIAMETER RBB-6650-50 BASE, and heating for 10 minutes at 120° C. was replaced by heating for 10 minutes at 150° C.

Curing conditions, thickness of silicone rubber layer, thickness of laminate sheet, peel adhesive strength, average warpage value, and so on were shown in Table 9. The laminate sheet had very large warpage degree.

Comparative Example 3

A laminate sheet wherein the silicone rubber sheet, i.e., the silicone rubber layer was adhesively laminated on the surface of the one side of the fluororesin film which had a reactive functional group as a result of a surface treatment on one side, was manufactured in the same condition as in Practical Example 1 except that heating for 10 minutes at 120° C. was replaced by heating for 10 minutes at 150° C.

Curing conditions, thickness of silicone rubber layer, thickness of laminate sheet, peel adhesive strength, average warpage value, and so on were shown in Table 9. The laminate sheet had fairy small peel adhesive strength and had very large warpage degree.

Comparative Example 4

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 1 except that a paste containing 75% by mass of a trimethylsiloxy-terminated methylhydrogenpolysiloxane having a viscosity of 50 mPa·s and a Sill content of 0.9% by mass and a platinum complex catalyst containing 150 ppm by mass of platinum were used in place of RC-14A, 1-ethynyl-1-cyclohexanol was used as a curing retarder, and except that 0.33 part by mass of the paste containing the trimethylsilyl-terminated methylhydrogenpolysiloxane, 1.0 part by mass of the platinum complex catalyst, and 0.14 part by mass of a paste containing 1-ethynyl-1-cyclohexanol were compounded per 100 part by mass of XIAMETER RBB-6650-50 BASE.

Curing conditions, thickness of silicone rubber layer, thickness of laminate sheet, peel adhesive strength, average warpage value, and so on were shown in Table 9. The laminate sheet had very small peel adhesive strength.

Comparative Example 5

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 7 except that heating 10 minutes at 130° C. was replaced by heating for 10 minutes at 140° C.

Curing conditions, thickness of silicone rubber layer, thickness of laminate sheet, peel adhesive strength, average warpage value, and so on were shown in Table 10. The laminate sheet had very large warpage degree.

Comparative Example 6

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 7 except that heating for 10 minutes at 130° C. was replaced by heating for 10 minutes at 150° C.

Curing conditions, thickness of silicone rubber layer, thickness of laminate sheet, peel adhesive strength, average warpage value, and so on were shown in Table 10. The laminate sheet had very large warpage degree.

TABLE 5

|  | Practical Example 1 | Practical Example 2 | Practical Example 3 |
|---|---|---|---|
| Notes | Difference in thickness of fluororesin film | | Addition of placing in hot wind |
| Thickness of fluororesin film | 100 μm | 50 μm | 100 μm |
| Millable-type silicone rubber base | RBB-6650-50 | RBB-6650-50 | RBB-6650-50 |
| Curing agent | RC-14A | RC-14A | RC-14A |
| Compounding amount of curing agent per 100 parts of millable-type silicone rubber base | 1.0 | 1.0 | 1.0 |
| Curing condition | 120° C., 10 minutes | 120° C., 10 minutes | 120° C., 10 minutes + 120° C., 30 minutes in hot wind |
| Thickness of silicone rubber layer | 900 μm | 950 μm | 900 μm |
| Thickness of laminate sheet | 1000 μm | 1000 μm | 1000 μm |
| Peel adhesive strength of laminate sheet | Peeling was impossible | Peeling was impossible | Peeling was impossible |
| Average warpage value of laminate sheet | 19.8 mm | 24.5 mm | 21.8 mm |
| Crease of fluororesin film of laminate sheet | no | no | no |

TABLE 6

|  | Practical Example 4 | Practical Example 5 | Practical Example 6 | Practical Example 7 | Practical Example 8 |
| --- | --- | --- | --- | --- | --- |
| Note | Difference in curing temperature and curing time | | | | |
| Thickness of fluororesin film | 100 μm | 100 μm | 100 μm | 100 μm | 100 μm |
| Millable-type silicone rubber base | RBB-2070-50 | RBB-2070-50 | RBB-2070-50 | RBB-2070-50 | RBB-6650-50 |
| Curing agent | RC-14A | RC-14A | RC-14A | RC-14A | RC-14A |
| Compounding amount of curing agent per 100 parts of millable-type silicone rubber base | 1.0 | 1.0 | 1.0 | 1.0 | 1.0 |
| Curing condition | 90° C., 120 minutes | 100° C., 30 minutes | 120° C., 10 minutes | 130° C., 10 minutes | 100° C., 60 minutes |
| Thickness of silicone rubber layer | 900 μm | 900 μm | 900 μm | 900 μm | 900 μm |
| Thickness of laminate sheet | 1000 μm | 1000 μm | 1000 μm | 1000 μm | 1000 μm |
| Peel adhesive strength of laminate sheet | Peeling was impossible | Peeling was impossible | Peeling was impossible | Peeling was impossible | 8.3 N |
| Average warpage value of laminate sheet | 10.5 mm | 23.5 mm | 23.3 mm | 15.8 mm | 14 mm |
| Crease of fluororesin film of laminate sheet | no | no | no | no | no |

TABLE 7

|  | Practical Example 9 | Practical Example 10 | Practical Example 11 | Practical Example 12 |
| --- | --- | --- | --- | --- |
| Notes | Difference in plasticity of millable silicone rubber base and hardness of silicone rubber | | Difference in curing agent | |
| Thickness of fluororesin film | 100 μm | 100 μm | 100 μm | 50 μm |
| Millable-type silicone rubber base | RBB-6630-30 | RBB-2070-70 | RBB-6650-50 | RBB-6650-50 |
| Curing agent | RC-14A | RC-14A | Per-cure O | Parkadox CH-50L |
| Compounding amount of curing agent per 100 parts of millable-type silicone rubber base | 1.0 | 1.0 | 1.0 | 1.0 |
| Curing condition | 120° C., 10 minutes | 120° C., 10 minutes | 120° C., 10 minutes | 120° C., 10 minutes |
| Thickness of silicone rubber layer | 900 μm | 900 μm | 900 μm | 900 μm |
| Thickness of laminate sheet | 1000 μm | 1000 μm | 1000 μm | 1000 μm |
| Peel adhesive strength of laminate sheet | Peeling was impossible | Peeling was impossible | 24 N | Peeling was impossible |
| Average warpage value of laminate sheet | 8.5 mm | 32.5 mm | 18 mm | 20 mm |
| Crease of fluororesin film of laminate sheet | no | no | no | no |

TABLE 8

|  | Practical Example 13 | Practical Example 14 | Practical Example 15 |
|---|---|---|---|
| Note | fluororesin film/silicone rubber/fluororesin film | | |
| Thickness of fluororesin film | 100 μmX2 | 100 μmX2 | 100 μmX2 |
| Millable-type silicone rubber base | RBB-2070-50 | RBB-2070-50 | RBB-2070-50 |
| Curing agent | RC-14A | RC-14A | RC-14A |
| Compounding amount of curing agent per 100 parts of millable-type silicone rubber base | 1.0 | 1.0 | 1.0 |
| Curing condition | 100° C., 30 minutes | 120° C., 10 minutes | 150° C., 10 minutes |
| Thickness of silicone rubber layer | 900 μm | 900 μm | 900 μm |
| Thickness of laminate sheet | 1100 μm | 1100 μm | 1100 μm |
| Peel adhesive strength of laminate sheet | Peeling was impossible | Peeling was impossible | Peeling was impossible |
| Average warpage value of laminate sheet | 1.5 mm | 3.3 mm | 3.0 mm |

TABLE 9

|  | Comparative Example 1 | Comparative Example 2 | Comparative Example 3 |
|---|---|---|---|
| Notes | organic peroxide having one-minute half-life temperature of higher than 150° C. | | Curing at high temperature |
| Thickness of fluororesin film | 100 μm | 100 μm | 100 μm |
| Millable-type silicone rubber base | RBB-6650-50 | RBB-6650-50 | RBB-6650-50 |
| Curing agent | RC-4(50P) | RC-3(50P) | RC-14A |
| Compounding amount of curing agent per 100 parts of millable-type silicone rubber base | 0.6 | 4.5 | 1.0 |
| Curing condition | 170° C., 10 minutes | 150° C., 10 minutes | 150° C., 10 minutes |
| Thickness of silicone rubber layer | 900 μm | 900 μm | 900 μm |
| Thickness of laminate sheet | 1000 μm | 1000 μm | 1000 μm |
| Peel adhesive strength of laminate sheet | 2.4 N | Peeling was impossible | 2.0 N |
| Average warpage degree of laminate sheet | warped to more than a semicircular arc shape | warped to more than a semicircular arc shape | warped to more than a semicircular arc shape |

TABLE 10

|  | Comparative Example 4 | Comparative Example 5 | Comparative Example 6 |
|---|---|---|---|
| Notes | Curing under hydrosilylation reaction | Difference in curing temperature | |
| Thickness of fluororesin film | 100 μm | 100 μm | 100 μm |
| Millable-type silicone rubber base | RBB-6650-50 | RBB-2070-50 | RBB-2070-50 |
| Curing agent, curing retarder | Methylhydrogen polysiloxane/platinum complex catalyst, RD9 | RC-14A | RC-14A |
| Compounding amount of curing agent, curing retarder per 100 parts of millable-type silicone rubber base | 0.33/1.0/0.14 | 1.0 | 1.0 |
| Curing condition | 120° C., 10 minutes | 140° C., 10 minutes | 150° C., 10 minutes |
| Thickness of silicone rubber layer | 900 μm | 900 μm | 900 μm |
| Thickness of laminate sheet | 1000 μm | 1000 μm | 1000 μm |

TABLE 10-continued

| | Comparative Example 4 | Comparative Example 5 | Comparative Example 6 |
|---|---|---|---|
| Peel adhesive strength of laminate sheet | 0.8 N | Peeling was impossible | Peeling was impossible |
| Average warpage degree of laminate sheet | | warped to more than a semicircular arc shape | warped to more than a semicircular arc shape |
| Average warpage value of laminate sheet | 12.5 mm | | |

Practical Example 16

A pressure-type kneader mixer was loaded with 2500 parts of a dimethylpolysiloxane gum terminated with dimetylvinylsiloxy groups of which Williams plasticity defined in JIS K6249 was 109 and 702 parts of a hydrophobized fumed silica (sold by NIPPON AEROSIL CO., LTD. under the trade name of AEROSIL RX200) at room temperature. The components were kneaded for 120 minutes at a rotational speed of 1800 times per hour, thereby a millable-type silicone rubber base A was produced.

The millable-type silicone rubber base A had a temperature of 144° C. at the end of kneading.

The millable-type silicone rubber base A was taken out and was allowed to cool to room temperature.

By using a two-roll mill, 100 parts by mass of this millable-type silicone rubber base A and 1.0 part by mass of RC-14A were compounded, thereby an organic peroxide-containing millable-type silicone rubber composition sheet was produced. This organic peroxide-containing millable-type silicone rubber composition was measured for physical properties. This organic peroxide-containing millable-type silicone rubber composition was loaded into the aforementioned metal frame and was heated under pressure for 10 minutes at 120° C., thereby a silicone rubber sheet was manufactured. Physical properties of the silicone rubber sheet were measured, and were shown in Table 11.

This organic peroxide-containing millable-type silicone rubber composition sheet was loaded into the aforementioned metal frame with an inner size of 120 mm, an inner size of 120 mm, and a depth of 0.9 mm, and was flattened.

The fluororesin film with a thickness of 100 µm which had carbonyl group and glycidyl group being reactive functional groups as a result of a surface treatment on one side was overlaid on the flattened organic peroxide-containing millable-type silicone one side rubber composition sheet so as for the one side having a reactive functional group as a result of a surface treatment to contact with said organic peroxide-containing millable-type silicone rubber composition, and the overlaid composite was heated under pressure for 10 minutes at 120° C., thereby a laminate sheet wherein the silicone rubber sheet, i.e., the silicone rubber layer was adhesively laminated on the surface of the one side of the fluororesin film which had a reactive functional group as a result of a surface treatment on one side was manufactured.

Curing conditions, thickness of silicone rubber layer, thickness of laminate sheet, peel adhesive strength, average warpage value, and so on were shown in Table 12.

In the laminate sheet, the fluororesin film and the silicone rubber sheet, i.e., the silicone rubber layer were firmly adhered to one another, the laminate sheet had small warpage degree, and the fluororesin film had no crease.

Practical Example 17

A pressure-type kneader mixer was loaded with 2500 parts of a dimethylsiloxane-methylvinylsiloxane copolymer gum terminated with trimetylsiloxy groups (vinyl group content: 0.57% by mass, Williams plasticity defined in JIS K6249: 109) and 702 parts of a hydrophobized fumed silica (sold by NIPPON AEROSIL CO., LTD. under the trade name of AEROSIL RX200) at room temperature. The components were kneaded for 180 minutes at a rotational speed of 1800 times per hour, thereby a millable-type silicone rubber base B was produced.

The millable-type silicone rubber base B had a temperature of 142° C. at the end of kneading.

The millable-type silicone rubber base B was taken out and was allowed to cool to room temperature.

By using a two-roll mill, 100 parts by mass of this millable-type silicone rubber base B and 1.0 part by mass of RC-14A were compounded, thereby an organic peroxide-containing millable-type silicone rubber composition sheet was produced. This organic peroxide-containing millable-type silicone rubber composition was measured for physical properties. This organic peroxide-containing millable-type silicone rubber composition was loaded into the aforementioned metal frame and was heated under pressure for 10 minutes at 120° C., thereby a silicone rubber sheet was manufactured. Physical properties of the silicone rubber sheet were measured, and were shown in Table 11.

This organic peroxide-containing millable-type silicone rubber composition sheet was loaded into the aforementioned metal frame with an inner size of 120 mm, an inner size of 120 mm, and a depth of 0.9 mm, and was flattened.

The fluororesin film with a thickness of 100 µm which had carbonyl group and glycidyl group being reactive functional groups as a result of a surface treatment on one side was overlaid on the flattened organic peroxide-containing millable-type silicone rubber composition sheet so as for the one side having a reactive functional group as a result of a surface treatment to contact with said organic peroxide-containing millable-type silicone rubber composition, and the overlaid composite was heated under pressure for 10 minutes at 120° C., thereby a laminate sheet wherein the silicone rubber sheet, i.e., the silicone rubber layer was adhesively laminated on the surface of the one side of the fluororesin film which had a reactive functional group as a result of a surface treatment on one side was manufactured.

Curing conditions, thickness of silicone rubber layer, thickness of laminate sheet, peel adhesive strength, average warpage value, and so on were shown in Table 12. In the laminate sheet, the fluororesin film and the silicone rubber sheet, i.e., the silicone rubber layer were firmly adhered to one another, the laminate sheet had small warpage degree, and the fluororesin film had no crease.

TABLE 11

| Items | Test method (unit) | Practical Example 16 | Practical Example 17 |
|---|---|---|---|
| Properties before curing | | | |
| Appearance | CTM 0176 | Milky white, Semi-transparent | Milky white, Semi-transparent |
| Plasticity | JIS K 6249(mm/100) | 220 | 230 |
| Properties after curing | | | |
| Specific gravity | JIS K 6249 (g/cm³) | 1.09 | 1.09 |
| Hardness (JIS type A) | JIS K 6249 | 37 | 44 |
| Tensile strength (No. 3 dumbbell) | JIS K 6249 (MPa) | 8.4 | 5.8 |
| Elongation (No. 3 dumbbell) | JIS K 6249 (%) | 630 | 315 |
| Tear strength (angle type) | JIS K 6249 (N/mm) | 27 | 25 |
| Linear shrinkage ratio (disk method) | JIS K 6249 (%) | 1.9 | 2.0 |

TABLE 12

| | Practical Example 16 | Practical Example 17 |
|---|---|---|
| Note | Preparation of millable-type silicone rubber base | |
| Thickness of fluororesin film | 100 μm | 100 μm |
| Millable-type silicone rubber base | A | B |
| Curing agent | RC-14A | RC-14A |
| Compounding amount of curing agent per 100 parts of millable-type silicone rubber base | 1.0 | 1.0 |
| Curing condition | 120° C., 10 minutes | 120° C., 10 minutes |
| Thickness of silicone rubber layer | 900 μm | 900 μm |
| Thickness of laminate sheet | 1000 μm | 1000 μm |
| Peel adhesive strength of laminate sheet | Peeling was impossible | 12.5 N |
| Average warpage value of laminate sheet | 15.0 mm | 25.8 mm |
| Crease of fluororesin film of laminate sheet | no | no |

Reference Example 1

A laminate sheet wherein the silicone rubber sheet was adhesively laminated on the surface of the one side of the fluororesin film which had a reactive functional group as a result of a surface treatment on one side was manufactured in the same condition as in Practical Example 3 except that heating in a circulating hot air oven of 120° C. after heated under pressure for 10 minutes at 120° C. was replaced by placing in a circulating hot air oven of temperatures shown in Table 13 for time periods shown in Table 13

Smell, peel adhesive strength, and average warpage value of the laminate sheet were shown in Table 13.

TABLE 13

| | Temperature, Time period | | | | |
|---|---|---|---|---|---|
| | 120° C., 30 min. | 120° C., 4 hours | 150° C., 4 hours | 170° C., 4 hours | 200° C., 4 hours |
| Smell | no | no | no | no | no |
| Peel adhesive strength | Peeling was impossible | 6.2 N | 4.6 N | 3.7 N | 3.9 N |
| Average warpage value of laminate sheet | 21.8 mm | 23.4 mm | 29.8 mm | 29.4 mm | 21.8 mm |

Reference Example 2

After a laminate sheet wherein the silicone rubber sheet was adhesively laminated on the surface of the one side of the fluororesin film which had a reactive functional group as a result of a surface treatment on one side was manufactured by heating under pressure for 10 minutes at 120° C. in Practical Example 6, the laminate sheet was placed in a circulating hot air oven of temperatures shown in Table 14 for time periods shown in Table 14.

Smell, peel adhesive strength, and average warpage value of the laminate sheet were shown in Table 14.

TABLE 14

| | Temperature, Time period | | | | |
|---|---|---|---|---|---|
| | 120° C., 30 min. | 120° C., 4 hours | 150° C., 4 hours | 170° C., 4 hours | 200° C., 4 hours |
| Smell | no | no | no | no | no |
| Peel adhesive strength | Peeling was impossible | Peeling was impossible | Peeling was impossible | Peeling was impossible | Peeling was impossible |
| Average warpage value | 26.8 mm | 28.7 mm | 26.6 mm | 26.9 mm | 25.8 mm |

Practical Example 18

A laminate sheet wherein the silicone rubber sheet was adhesively laminated on the surface of the one side of the fluororesin film which had a reactive functional group as a result of a surface treatment on one side was manufactured in the same condition as in Practical Example 6 except that a metal frame with an inner size of 120 mm, an inner size of 120 mm, and a depth of 0.5 mm was used in place of the metal frame with an inner size of 120 mm, an inner size of 120 mm, and a depth of 0.9 mm.

Curing conditions, thickness of silicone rubber layer, thickness of laminate sheet, peel adhesive strength, average warpage value, and so on were shown in Table 15.

In the laminate sheet, the fluororesin film and the silicone rubber sheet, i.e., the silicone rubber layer with a thickness of 0.5 mm were firmly adhered to one another, the laminate sheet had small warpage degree, and the fluororesin film had no crease.

Practical Example 19

A laminate sheet wherein the silicone rubber sheet was adhesively laminated on the surface of the one side of the fluororesin film which had a reactive functional group as a result of a surface treatment on one side was manufactured in the same condition as in Practical Example 6 except that a metal frame with an inner size of 120 mm, an inner size of 120 mm, and a depth of 4.0 mm was used in place of the metal frame with an inner size of 120 mm, an inner size of 120 mm, and a depth of 0.9 mm.

Curing conditions, thickness of silicone rubber layer, thickness of laminate sheet, peel adhesive strength, average warpage value, and so on were shown in Table 15.

In the laminate sheet, the fluororesin film and the silicone rubber sheet, i.e., the silicone rubber layer with a thickness of 4.0 mm were firmly adhered to one another, the laminate sheet had small warpage degree, and the fluororesin film had no crease.

TABLE 15

|  | Practical Example 18 | Practical Example 19 |
|---|---|---|
| Note | Difference in thickness of silicone rubber layer | |
| Thickness of fluororesin film | 100 μm | 100 μm |
| Millable-type silicone rubber base | RBB-2070-50 BASE | RBB-2070-50 BASE |
| Curing agent | RC-14A | RC-14A |
| Compounding amount of curing agent per 100 parts of millable-type silicone rubber base | 1.0 | 1.0 |
| Curing condition | 120° C., 10 minutes | 120° C., 10 minutes |
| Thickness of silicone rubber layer | 50 μm | 4.0 mm |
| Thickness of laminate sheet | 150 μm | 4.1 mm |
| Peel adhesive strength of laminate sheet | Peeling was impossible | Peeling was impossible |
| Average warpage value of laminate sheet | 8.8 mm | 25.3 mm |
| Crease of fluororesin film of laminate sheet | no | no |

Practical Example 20

A laminate sheet wherein the silicone rubber sheet, i.e., the silicone rubber layer was adhesively laminated on the surface of the one side of the fluororesin film which had a reactive functional group as a result of a surface treatment on one side was manufactured in the same condition as in Practical Example 4 except that a commercially available tetrafluoroethylene-hexafluoropropylene copolymer (FEP) with a thickness of 500 μm which had carbonyl group and hydroxyl group being reactive functional groups as a result of a surface etching treatment on one side was used as a fluororesin film which had reactive functional groups as a result of a surface treatment on one side, heating under pressure for 10 minutes at 120° C. was adopted as curing condition, 700 μm was selected as a thickness of the silicone rubber layer, and 1200 μm was selected as a thickness of the laminate sheet.

Peel adhesive strength of the laminate sheet was 9.7N, average warpage value of the laminate sheet was 17 mm, and the fluororesin film had no crease.

INDUSTRIAL APPLICABILITY

The method for manufacturing the laminate sheet of the present invention is useful for manufacturing a laminate sheet wherein the fluororesin film and the silicone rubber sheet, i.e. silicone rubber layer, are firmly adhered to one another and the laminate sheet has small warpage degree.

The laminate sheet of the present invention is useful as materials for septum used in vial bottles, inner packing for lids used in various containers, water shielding sheet, gas shielding sheet, and so on.

DESCRIPTION OF THE REFERENCE NUMERALS 1 fluororesin film
2 silicone rubber sheet, i.e., silicone rubber layer

The invention claimed is:

1. A method of manufacturing a laminate sheet, the method comprising the steps of:
   (1) providing a fluororesin film with a thickness of 10-1000 μm, wherein a surface of the fluororesin film has a reactive functional group as a result of a surface treatment, wherein the reactive functional group is selected from the group consisting of an unsaturated aliphatic hydrocarbon group, an alkenyl group, an epoxy group, an acryloxy group, a methacryloxy group, an amide group, a glycidyl group, a combination of a carbonyl group and an epoxy group, and a combination of a carbonyl group and a glycidyl group,
   (2) providing a millable silicone rubber composition sheet with a thickness of 0.2-5.0 mm, wherein the millable silicone rubber composition sheet comprises a millable silicone rubber composition containing (a1) a hydrophobized reinforcing silica filler or (a2) a reinforcing silica filler and a hydrophobizing agent, and (b) an organic peroxide having a one-minute half-life temperature in a temperature range of 100–150° C.;
   (3) overlapping the fluororesin film and the millable silicone rubber composition sheet so that a side of the fluororesin film having the reactive functional group as a result of the surface treatment contacts the silicone rubber composition sheet; and
   (4) curing the millable silicone rubber composition sheet by heating under pressure at 90-135° C. to produce the laminate sheet, which is characterized in that the fluororesin film and a silicone rubber sheet formed by curing the millable silicone rubber composition sheet adhere to one another, the laminate sheet has a peel adhesion strength of 5N/25 mm or more as measured on a test strip of the laminate sheet in accordance with JIS K6854-2, and an average warpage value of the four corners of a 120 mm square test sample of the laminate sheet is 35 mm or less.

2. The method of manufacturing the laminate sheet according to claim 1, wherein the organic peroxide is selected from the group consisting of diacylperoxides and peroxyesters.

3. The method of manufacturing the laminate sheet according to claim 1, wherein, after curing the millable silicone rubber composition sheet by heating under pressure at 90-135° C., the laminate sheet is placed in hot wind to remove decomposed products of the organic peroxide.

4. A laminate sheet, manufactured according to the method of claim 1, wherein:
   (a) the fluororesin film has the reactive functional group on at least one side of the film as a result of the surface treatment; and
   (b) the silicone rubber sheet has a thickness of 0.2-5.0 mm.

5. The laminate sheet according to claim 4, wherein the fluororesin film is selected from the group consisting of a tetrafluoroethylene-hexafluoropropylene copolymer (FEP) film, a tetrafluoroethylene-perfluoroalkyl vinyl ether copolymer (PFA) film, and a polytetrafluoroethylene (PTFE) film.

* * * * *